US012432309B2

(12) United States Patent
Agarwal et al.

(10) Patent No.: US 12,432,309 B2
(45) Date of Patent: Sep. 30, 2025

(54) SPEECH-BASED VISUAL INDICATOR DURING COMMUNICATION SESSION

(71) Applicant: QUALCOMM Incorporated, San Diego, CA (US)

(72) Inventors: Tanmay Agarwal, Najibabad (IN); Sandeep Sethia, Bengaluru (IN); Ravichandra Ponaganti, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 325 days.

(21) Appl. No.: 18/172,853

(22) Filed: Feb. 22, 2023

(65) Prior Publication Data

US 2024/0283887 A1 Aug. 22, 2024

(51) Int. Cl.
*H04N 5/262* (2006.01)
*G10L 15/08* (2006.01)
*G10L 15/26* (2006.01)

(52) U.S. Cl.
CPC ............ *H04N 5/262* (2013.01); *G10L 15/08* (2013.01); *G10L 15/26* (2013.01)

(58) Field of Classification Search
CPC .......... H04N 5/262; G10L 15/08; G10L 15/26
USPC ...................................................... 348/14.07
See application file for complete search history.

(56) References Cited

U.S. PATENT DOCUMENTS

| 8,612,211 | B1* | 12/2013 | Shires ................... G10L 15/26 |
| | | | 704/235 |
| 2007/0140291 | A1* | 6/2007 | Li ......................... H04L 1/0083 |
| | | | 370/463 |
| 2009/0254839 | A1 | 10/2009 | Kripalani et al. |
| 2010/0246784 | A1 | 9/2010 | Frazier et al. |
| 2014/0247996 | A1* | 9/2014 | Lin ...................... G06V 10/809 |
| | | | 382/218 |
| 2015/0296181 | A1 | 10/2015 | Sanso |
| 2017/0308545 | A1* | 10/2017 | Soni ..................... G06F 16/156 |
| 2020/0105251 | A1 | 4/2020 | Meshram |
| 2020/0174740 | A1* | 6/2020 | Martay .................. H04R 3/00 |
| 2020/0403817 | A1 | 12/2020 | Daredia et al. |
| 2021/0056973 | A1 | 2/2021 | Srivastava et al. |
| 2022/0391044 | A1 | 12/2022 | Huang et al. |

(Continued)

OTHER PUBLICATIONS

Kriman S., et al., "Quartznet: Deep Automatic Speech Recognition with 1D Time-Channel Separable Convolutions", arXiv:1910.10261v1 [eess.AS] Oct. 22, 2019, 5 Pages.

(Continued)

*Primary Examiner* — Binh Kien Tieu
(74) *Attorney, Agent, or Firm* — QUALCOMM Incorporated; Espartaco Diaz Hidalgo

(57) ABSTRACT

A device includes one or more processors configured to detect, during a communication session that includes an audio component and a video component, that the audio component includes particular speech of a participant of the communication session. The one or more processors are further configured to detect that the video component includes an object that is associated with the particular speech. The one or more processors are further configured to update the video component to apply a visual indicator to the object, the visual indicator including at least one of a pointer indicator, a text effect, or highlighting.

29 Claims, 15 Drawing Sheets

(56) References Cited

U.S. PATENT DOCUMENTS

2023/0243622 A1* 8/2023 Isakov .................. F41G 3/165
                                                     89/41.05

OTHER PUBLICATIONS

Li J., et al., "Jasper: An End-to-End Convolutional Neural Acoustic Model", arXiv:1904.03288v3 [eess.AS] Aug. 27, 2019, 5 Pages.
International Search Report and Written Opinion—PCT/US2024/016379—ISA/EPO—Jul. 15, 2024.

* cited by examiner

SPEECH-BASED VISUAL INDICATOR DURING COMMUNICATION SESSION

I. FIELD

The present disclosure is generally related to visual indicators used during a communication session.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Such computing devices can be used to facilitate voice and/or video communication sessions (such as conference calls or videoconferences). Computing devices that support video communication sessions often enable one or more participants to share visual content, such as via screen sharing that allows other participants to view a shared document. For example, a presenter can share a screen on which a series of slides are displayed by the presenter so that other participants of the video communication session can follow along as the presenter describes the content of the individual slides. Devices that support such communication sessions often provide an option for a participant to display a visual indicator such as a mouse pointer on the screen, enabling the participant to direct attention to one or more elements of the shared content being displayed. For example, when a presenter is describing a slide that includes a bulleted list of text items, the presenter can control the mouse pointer to hover on a particular bullet point that the presenter is discussing.

When used appropriately, such visual indicators are useful for directing the attention of participants and adding clarity to such presentations. However, a presenter may forget to update the position of the indicator when the presenter changes the discussion topic, which can cause confusion to the other participants. Additionally, having to repeatedly reposition the indicator as the presentation progresses can be distracting or burdensome to the presenter and restricts the presenter's ability to perform other actions with the presenter's hands, such as gesturing, holding notecards or other reference materials, or taking notes.

III. SUMMARY

According to a particular aspect, a device includes one or more processors configured to detect, during a communication session that includes an audio component and a video component, that the audio component includes particular speech of a participant of the communication session. The one or more processors are further configured to detect that the video component includes an object that is associated with the particular speech. The one or more processors are further configured to update the video component to apply a visual indicator to the object, the visual indicator including at least one of a pointer indicator, a text effect, or highlighting.

According to a particular aspect, a method includes detecting, at a device and during a communication session that includes an audio component and a video component, that the audio component includes particular speech of a participant of the communication session. The method also includes detecting, at the device, that the video component includes an object that is associated with the particular speech. The method further includes updating, at the device, the video component to apply a visual indicator to the object, the visual indicator including at least one of a pointer indicator, a text effect, or highlighting.

According to a particular aspect, a non-transitory computer-readable medium stores instructions that are executable by one or more processors to cause the one or more processors to detect, during a communication session that includes an audio component and a video component, that the audio component includes particular speech of a participant of the communication session. The instructions are further executable to detect that the video component includes an object that is associated with the particular speech. The instructions are further executable to update the video component to apply a visual indicator to the object, the visual indicator including at least one of a pointer indicator, a text effect, or highlighting.

According to a particular aspect, an apparatus includes means for detecting, during a communication session that includes an audio component and a video component, that the audio component includes particular speech of a participant of the communication session. The apparatus also includes means for detecting that the video component includes an object that is associated with the particular speech. The apparatus further includes means for updating the video component to apply a visual indicator to the object, the visual indicator including at least one of a pointer indicator, a text effect, or highlighting.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
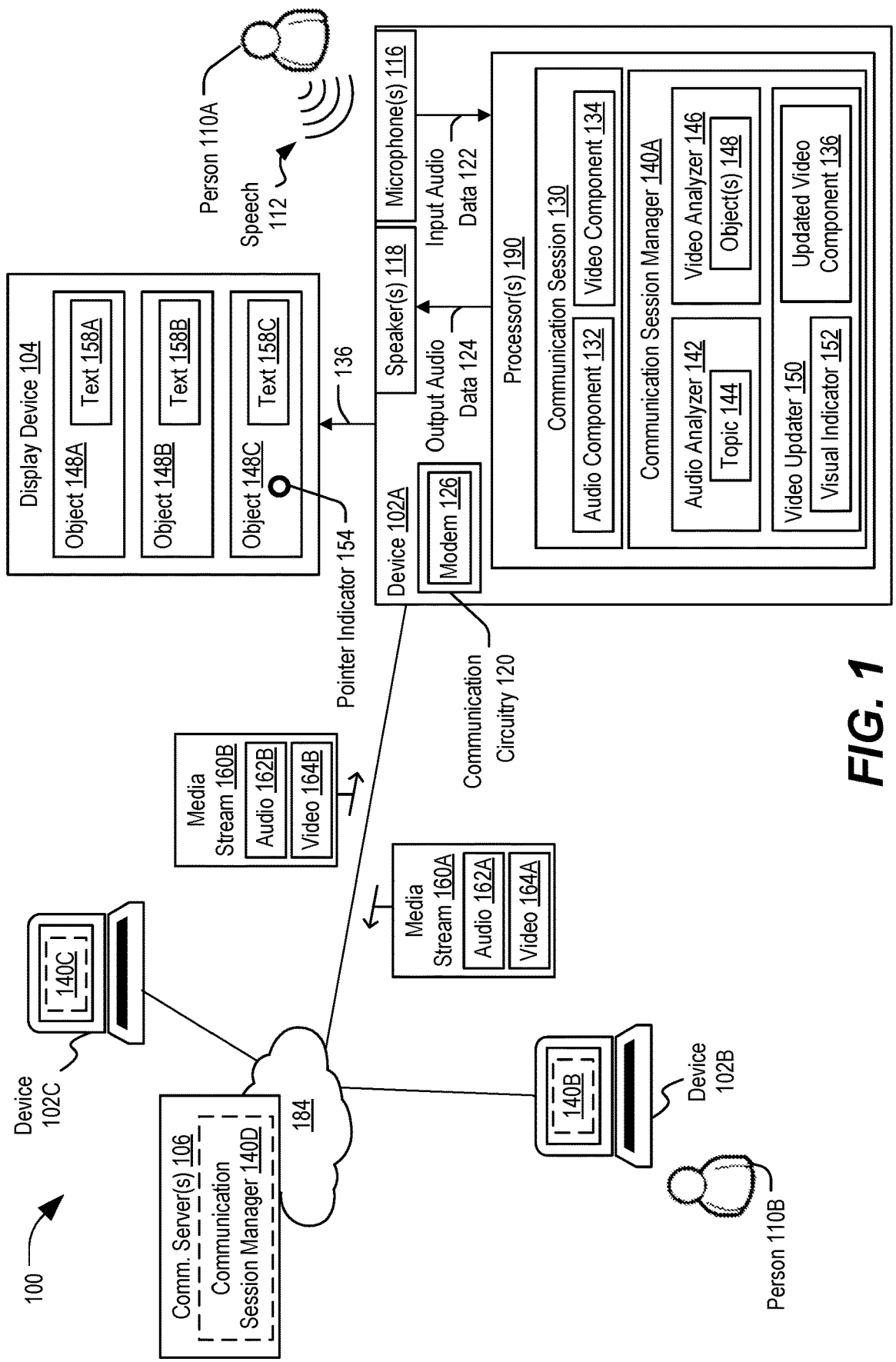
FIG. 1 is a block diagram of a particular illustrative aspect of a system operable to apply a speech-based visual indicator to a video component of a communication session, in accordance with some examples of the present disclosure.

Although the use of visual indicators such as mouse pointers is helpful for directing the attention of participants and adding clarity to presentations, such as during a video conference, such visual indicators can introduce confusion when a presenter forgets to update the position of the indicator. Also, having to repeatedly reposition the indicator to follow the presentation discussion can be distracting or burdensome to the presenter, in addition to restricting the presenter's ability to perform other actions with the presenter's hands.

Devices and methods are disclosed for applying a speech-based visual indicator to a video component of a communication session. The disclosed techniques provide a presenter with an automated way to hover a pointer or otherwise highlight content displayed during a screen sharing session. According to an aspect, the presenter's speech is analyzed to identify a particular topic being discussed, and the visual indicator is automatically positioned to highlight or emphasize text or other objects in the displayed content that correspond to the identified discussion topic. By automatically updating the position of the indicator based on the content of the presenter's speech, the above-described drawbacks associated with conventional presentation systems are avoided.

According to some aspects, machine learning techniques, such as neural networks, are employed to determine the discussion topic of the presenter's speech as well as to analyze the accompanying visual content, such as a shared document, to determine where to position the visual indicator. In a particular implementation, speech topic detection is performed using speech-to-text analysis, and the visual content is analyzed using frame-to-text analysis. As the discussion topic changes, or as the visual content is updated, the location of the visual indicator is updated to remain relevant to the most recently identified discussion topic.

According to some aspects, when the discussion topic identified from the presenter's speech is not identified in the currently displayed visual content, a search can be automatically performed for relevant images associated with the discussion topic, and an image obtained via the search can be automatically inserted into the displayed content. According to another aspect, when the discussion topic identified from the presenter's speech is not identified in the currently displayed visual content, such as when the presenter begins discussing a block diagram or flowchart that is not present in the currently displayed visual content, the block diagram or flowchart can be automatically generated on-the-fly and inserted into the displayed visual content based on the presenter's description.

According to some aspects, the presenter's speech is further analyzed to detect jargon, such as one or more utterances that are associated with particular actions or usages, such as "go to next slide" or "on the left side of the screen." When such jargon is detected, the actions or usages associated with the jargon can be automatically performed or applied. In some implementations, when performing an action such as navigating to a next slide of a slide deck that is being shared, a current position of the visual indicator is recorded so that, if the presenter later returns to the current slide, the visual indicator can be automatically restored to its most recent position on the slide.

According to some aspects, the disclosed techniques can be performed based on received audio content and video content of a communication session, and thus can be performed at various devices that may be participating in the communication session. For example, the automatic insertion of visual indicators based on a presenter's speech can be performed at an end-user device of the participant that is currently speaking, at an end-user device of a participant that is currently sharing the video content, at an end-user device of a participant that is receiving both the audio and the video content from remote sources, or at a communication server that manages the communication session, as illustrative, non-limiting examples.

A technical advantage of automatically generating a speech-based visual indicator is that a presenter of the communication session can engage in a hands-free presentation that automatically provides visual emphasis to portions of the displayed slide(s) or page(s) that are currently being discussed. As a result, the presenter's hands are free to engage in other activities during the presentation while still retaining the benefits associated with a manually operated pointer. Further, the automatic positioning of the visual indicator can provide a more consistently reliable guide for viewers as compared to manually operated pointers. In addition, because the disclosed techniques can be performed based on received audio content and video content of a communication session, the automatic speech-based positioning of the visual indicator can be performed at a device that does not have access to the source documents being displayed, which can improve the functioning of a presenter's device by offloading the computational load of speech analysis and video analysis to another device, such as a remote server.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 102A including one or more processors ("processor(s)" 190 of FIG. 1), which indicates that in some implementations the device 102A includes a single processor 190 and in other implementations the device 102A includes multiple processors 190. For ease of reference herein, such features are generally introduced as "one or more" features and are subsequently referred to in the singular or optional plural (as indicated by "(s)") unless aspects related to multiple of the features are being described.

In some drawings, multiple instances of a particular type of feature are used. Although these features are physically and/or logically distinct, the same reference number is used for each, and the different instances are distinguished by addition of a letter to the reference number. When the features as a group or a type are referred to herein e.g., when no particular one of the features is being referenced, the reference number is used without a distinguishing letter. However, when one particular feature of multiple features of the same type is referred to herein, the reference number is used with the distinguishing letter. For example, referring to FIG. 1, multiple devices are illustrated and associated with reference numbers 102A, 102B, and 102C. When referring to a particular one of these devices, such as a device 102A, the distinguishing letter "A" is used. However, when referring to any arbitrary one of these devices or to these devices as a group, the reference number 102 is used without a distinguishing letter.

As used herein, the terms "comprise," "comprises," and "comprising" may be used interchangeably with "include," "includes," or "including." Additionally, the term "wherein" may be used interchangeably with "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

FIG. 1 is a block diagram of a particular illustrative aspect of a system 100 operable to apply a speech-based visual indicator to a video component of a communication session, in accordance with some examples of the present disclosure. In FIG. 1, the system 100 includes multiple devices 102 (including device 102A, 102B, and 102C), which are participating in a communication session 130. Although FIG. 1 illustrates three devices 102, in other implementations, the system 100 includes more or fewer devices 102.

The communication session 130 includes at least an audio component 132 and a video component 134 that are transmitted to one or more of the devices 102, from one or more of the devices 102, or both, via a media stream 160 (e.g., including audio 162 and video 164). In some implementations, the communication session 130 corresponds to at least one of a conference call, a seminar, or a multi-participant extended reality session, as illustrative, non-limiting examples. As a particular example, the communication session 130 can include a conference call that includes both audio and video components, such as a video conference with screen sharing. As explained further below, the system 100 includes one or more communication session managers 140 that are configured to automatically add a visual indicator 152, such as a pointer indicator 154, to the video component 134 to generate an updated video component 136 based on the speech of one or more participants of the communication session 130. For example, when a person 110A giving a presentation using screen sharing at the device 102A speaks about an item on a presented slide, a communication session manager 140 can automatically add a pointer indicator 154 that points to the referenced item and that is viewable by all participants of the communication session 130, such as a person 110B operating the device 102B.

In the system 100, the devices 102 communicate via one or more networks 184. In the example illustrated in FIG. 1, one or more communication session servers 106 of a communication service are coupled to the network 184 and operable to support the communication session 130 between the devices 102.

FIG. 1 illustrates a particular example of aspects of the device 102A. While details of the other devices 102B, 102C are not shown in FIG. 1, each of the other devices 102B, 102C may include similar or identical features to those described with reference to the device 102A. In some examples, one or more of the other devices 102B, 102C may include additional features, fewer features, one or more different features, or a combination thereof, than those described with reference to the device 102A. In FIG. 1, the device 102A includes communication circuitry 120, one or more speakers 118, and one or more microphones 116 coupled to one or more processors 190. In addition, the device 102A is coupled to or includes a display device 104 configured to display the updated video component 136 that includes the visual indicator 152.

The communication circuitry 120 is configured to enable communication via the network 184. As illustrated, the communication circuitry 120 includes a modem 126 configured to receive at least one of the audio component 132, the video component 134, or the updated video component 136, from a remote device 102 or from the communication session server(s) 106, send at least one of the audio component 132, the video component 134, or the updated video component 136 to a remote device 102 or to the communication session server(s) 106, or both. The communication circuitry 120 may also include one or more other components, such as a transceiver. In a particular aspect, the communication circuitry 120 is configured to support one or more wireless communications protocols, such as a Bluetooth® communication protocol, a Bluetooth® Low-energy (BLE) communication protocol, a Zigbee® communication protocol, a Wi-Fi® communication protocol, one or more other wireless local area network protocols, or any combination thereof (Bluetooth® is a registered trademark of Bluetooth SIG, Inc.; Zigbee® is a registered trademark of Connectivity Standards Alliance; Wi-Fi® is a registered trademark of Wi-Fi Alliance). Additionally, or alternatively, in some implementations, the communication circuitry 120 is configured to support wide-area wireless communication protocols, such as one or more cellular voice and data network protocols from a 3rd Generation Partnership Project (3GPP) standards organization. Further, in some implementations, the communication circuitry 120 is configured to support one or more wired communications protocols. For example, in such implementations, the communication circuitry 120 also includes one or more data ports, such as Ethernet ports, universal serial bus (USB) ports, etc.

The microphone(s) 116 are configured to capture particular speech 112 of the person 110A, and the speaker(s) 118 are configured to play out sound based on the audio component 132 of the communication session 130. Although the microphone(s) 116 and the speaker(s) 118 are illustrated in FIG. 1 as integrated within the device 102A, in some implementations, one or more of the microphone(s) 116, the speaker(s) 118, or both, are external to the device 102A and coupled to the processor(s) 190 via one or more audio ports, data ports, or other interface circuitry.

The processor(s) 190 include a communication session manager 140A that is operable to initiate, control, support, or otherwise perform operations associated with the communication session 130. For example, the communication session manager 140A may include, correspond to, or be included within an end-user application associated with the communication service. In other examples, the communication session manager 140A is a separate application that facilitates control of the device 102A during the communication session 130 and possibly at other times. To illustrate, the communication session manager 140A may include a media application or plug-in that interacts with the communication session server(s) 106.

In the example illustrated in FIG. 1, particular aspects of the communication session manager 140A are shown, including an audio analyzer 142, a video analyzer 146, and a video updater 150. In some implementations, the communication session manager 140A includes more, fewer, or different components. For example, in some implementations, the communication session manager 140A includes a screen sharing interface, a chat interface, or other components associated with the communication service.

The audio analyzer 142 is configured to detect, during the communication session 130, that the audio component 132 includes particular speech, such as a topic 144, of a participant of the communication session 130. To illustrate, in an implementation in which the person 110A is presenting during a video conference, the speech 112 of the person 110A is captured by the microphones 116 to generate input audio data 122. The input audio data 122 is provided to the processor(s) 190 and used as (or included in) the audio component 132. In such implementations, the audio analyzer 142 processes the audio component 132 to identify particular speech, such as the topic 144. According to some aspects, the audio analyzer 142 is configured to use a speech-to-text network to process the audio component 132 to detect the particular speech, such as described further with reference to FIG. 2 and FIG. 4.

The video analyzer 146 is configured to process the video component 134 and determine one or more objects 148 that are present in the video component 134. For example, the video component 134 can include a slide or page of a document being presented by the person 110A, and the video analyzer 146 identifies the object(s) 148 in the slide or page. (Although "slide" and "page" are used herein for purpose of explanation, it should be understood the present disclosure is not limited to any particular document type, and thus terms such as "slide," "page," "sheet," "worksheet," "spreadsheet," etc. that are associated with various productivity office applications and that represent portions or subdivisions of an underlying document are to be considered interchangeable and not restrictive to any particular document type.) Examples of objects 148 that can be identified include at least one of text, a bullet point, a table element, or a graphical element that includes text, as illustrative, non-limited examples.

According to some aspects, the video analyzer 146 is configured to detect that the video component 134 includes a particular object 148 that is associated with the particular speech (e.g., the topic 144 detected by the audio analyzer 142). In an example, the video analyzer 146 determines that an object 148A includes or is otherwise associated with text 158A, an object 148B includes or is otherwise associated with text 158B, and an object 148C includes or is otherwise associated with text 158C. In some implementations, the video analyzer 146 is configured to use an image-to-object network to process the video component 134 to detect the object(s) 148, the text 158 associated with the objects 148, or both, such as described further with reference to FIG. 2 and FIG. 5.

According to some aspects, the communication session manager 140A performs a comparison of the topic 144 to the objects 148 to determine if an object 148 matches the topic 144. To illustrate, the communication session manager 140A can compare the topic 144 to the text 158 of the objects 148 and determine that the text 158C of the object 148C matches the topic 144. In some implementations, such comparisons are performed by the video analyzer 146. In other implementations, the comparisons can be performed by one or more other components of the communication session manager 140A, such as a speech-to-object matcher as described further with reference to FIG. 2.

The video updater 150 is configured to update the video component 134 to apply a visual indicator 152 to the object 148 that is determined to match the particular speech. For example, the video updater 150 updates the video component 134 (e.g., the image of the presented slide or page of a shared document) to add the pointer indicator 154 to point to the object 148C in response to determining that the text 158C matches the topic 144. Although in FIG. 1 the visual indicator 152 is displayed as a pointer indicator 154 (e.g., a dot, circle, arrow, etc.), the visual indicator 152 can generally include any indicator configured to emphasize or draw a viewer's attention to a selected object 148 and can include at least one of a pointer indicator, a text effect, or highlighting, as described further with reference to FIG. 3.

The resulting updated video component 136 can be provided to the display device 104 to display to the person 110A. In addition, the updated video component 136 can be provided to the device 102B and the device 102C via transmission of a media stream 160A from the device 102A via the network 184. For example, the media stream 160A can include audio 162A corresponding to the audio component 132 (e.g., including the speech 112) and video 164A corresponding to the updated video component 136 (e.g., the displayed slide or page with the pointer indicator 154 inserted). In some implementations, the media stream 160A is transmitted to the communication session server(s) 106 and distributed from the communication session server(s) 106 to the other devices 102 participating in the communication session 130, such as the device 102B and the device 102C. In other examples, the devices 102 communicate according to a peer-to-peer implementation that excludes or bypasses the communication session server(s) 106, and the media stream 160A is sent from the device 102A to the other devices 102 via the network 184.

As illustrated, instances of the communication session manager 140 can optionally be implemented at one or more of the other devices 102, such as a communication session manager 140B at the device 102B and a communication session manager 140C at the device 102C. Optionally, a communication session manager 140D can be implemented at the communication session server(s) 106. Technical advantages of implementing the communication session manager 140D at the communication session server(s) 106 can include providing a similar experience at each of the devices 102, offloading resource intensive computations to the communication session server(s) 106, etc. Technical advantages of implementing the communication session manager 140 at a device 102 can include compatibility with existing communication session server(s) 106 or advantages of peer-to-peer communication without a central communication session server, etc. Various use cases are described below.

In a first use case, the communication session manager 140 is included in an end-user device configured to send a media stream 160 that includes the audio component 132 and the updated video component 136 to remote device(s) 102. To illustrate, the device 102A can be an end-user device of the person 110A. The person 110A is an "audio presenter" of the communication session 130 in that the person 110A is designated, at least temporarily, as the participant whose speech is analyzed to determine matches to objects 148 in the currently displayed slide(s) or page(s). In this first use case, the device 102A of the audio presenter (the person 110A) processes the speech of the audio presenter (e.g., the speech 112 of the person 110A), determines a match to one of the objects 148, updates the video component 134 by adding a visual indicator 152, and sends the resulting audio component 132 and updated video component 136, via the media stream 160A, to the remote devices 102B and 102C. In this example, while the person 110A is the audio presenter, any of the communication session manager 140B, the communication session manager 140C, and the communication session manager 140D that may be included in the system 100 refrains from performing the audio and video analysis described for the communication session manager 140A and may instead passively receive and present the audio component 132 and the updated video component 136 from the device 102A. In some implementations, one or more of the device 102B, the device 102C, or the communication session server(s) 106 do not include a communication session manager 140 configured to perform the audio and video analysis described for the communication session manager 140A and may passively receive and present the audio component 132 and the updated video component 136 from the device 102A.

In a second use case, the communication session manager 140 is included in an end-user device 102 configured to receive, from a remote device, a media stream 160 that includes the audio component 132 and the video component 134. In contrast to the first use case, in the second use case the analysis of the audio presenter's speech, comparison to the objects 148, and insertion of the visual indicator 152 is not performed at the device 102 of the audio presenter and is instead performed locally at the end-user device 102 of one or more recipients of the media stream 160. In an example in which the person 110B is the audio presenter, the device 102B of the person 110B captures the speech of the person 110B and transmits the captured speech as audio 162B of a media stream 160B. The media stream 160B also includes video 164B representing the video component 134, such as the currently displayed slide(s) or page(s) shared by the person 110B.

Continuing the second use case example, the media stream 160B is received by the device 102A, which provides the audio component 132 as output audio data 124 for playout to the person 110A via the speakers 118. In addition, the communication session manager 140A processes the audio component 132 and the video component 134 as described above and, if a match is detected between the topic 144 and an object 148, generates the updated video component 136 and sends the updated video component 136 to the display device 104 for display to the person 110A. If no match is detected, the device 102A outputs the video component 134 (without adding a visual indicator 152) to the to the display device 104 for display to the person 110A. In some implementations, the device 102A may send data conveying the location of the visual indicator 152 to one or more of the device 102B, the device 102C, or the communication session server(s) 106, which may enable the visual indicator 152 to also be displayed at one or more of the other devices 102B, 102C.

In a third use case, the communication session manager 140 is included in a communication session server 106 configured to send the updated video component 136 to one or more end-user devices 102 of participants of the communication session 130. In this use case, the analysis of the audio presenter's speech, comparison to the objects 148, and insertion of the visual indicator 152 is not performed at the device 102 of the audio presenter and is instead performed at the communication session server 106 prior to transmission to one or more participants of the communication session 130. In an example of the third use case in which the person 110B is the audio presenter, the device 102B captures the speech of the person 110B and transmits the captured speech (e.g., the audio component 132) to the communication session server 106 as audio of a media stream. The media stream also includes video representing the video component 134, such as the currently displayed slide(s) or page(s) shared by the person 110B or shared by one or more other participants of the communication session 130, such as the person 110A.

Continuing the third use case example, the communication session manager 140D at the communication session server 106 processes the audio component 132 and the video component 134 and, if a match is detected between the topic 144 and an object 148, generates the updated video component 136. The communication session server 106 sends the audio component 132 and the updated video component 136 (or the video component 134 if no match is detected) to the other devices 102A and 102C participating in the communication session 130, such as via a media stream 160. In some implementations, the communication session server 106 also sends the updated video component 136 to the device 102B so that the person 110B can also view the visual indicator 152 that has been added by the communication session server 106 to the currently displayed slide(s) or page(s).

Although depicted as laptop or desktop-type computing devices, it should be understood that one or more of the devices 102 may be another type of device. In an illustrative example, the communication session manager 140 is integrated in a headset that includes the microphone(s) 116 coupled to the processor(s) 190, and the microphone(s) 116 are configured to capture the particular speech of the participant to enable the participant to deliver a hands-free presentation with automatic visual indicators 152 during the communication session 130 while the participant is engaged in physical activity. In one particular example, the headset corresponds to an audio headset, such as described further with reference to FIG. 13. In another particular example, the headset corresponds to an extended reality headset that includes a head-mounted display device coupled to the one or more processors 190 to enable display of the updated video component 136 to a user, such as described further with reference to FIG. 17.

Figure 18:
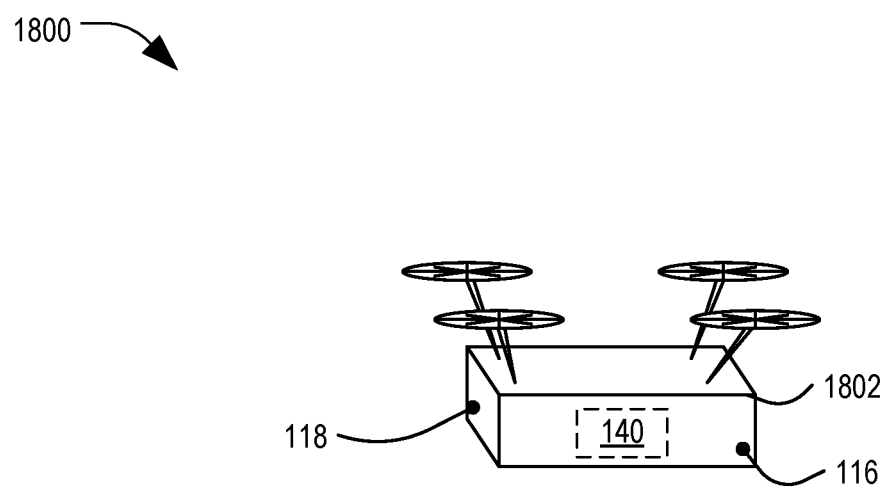
FIG. 18 is a diagram of a first example of a vehicle operable to facilitate application of a speech-based visual indicator to a video component of a communication session, in accordance with some examples of the present disclosure.
Figure 19:
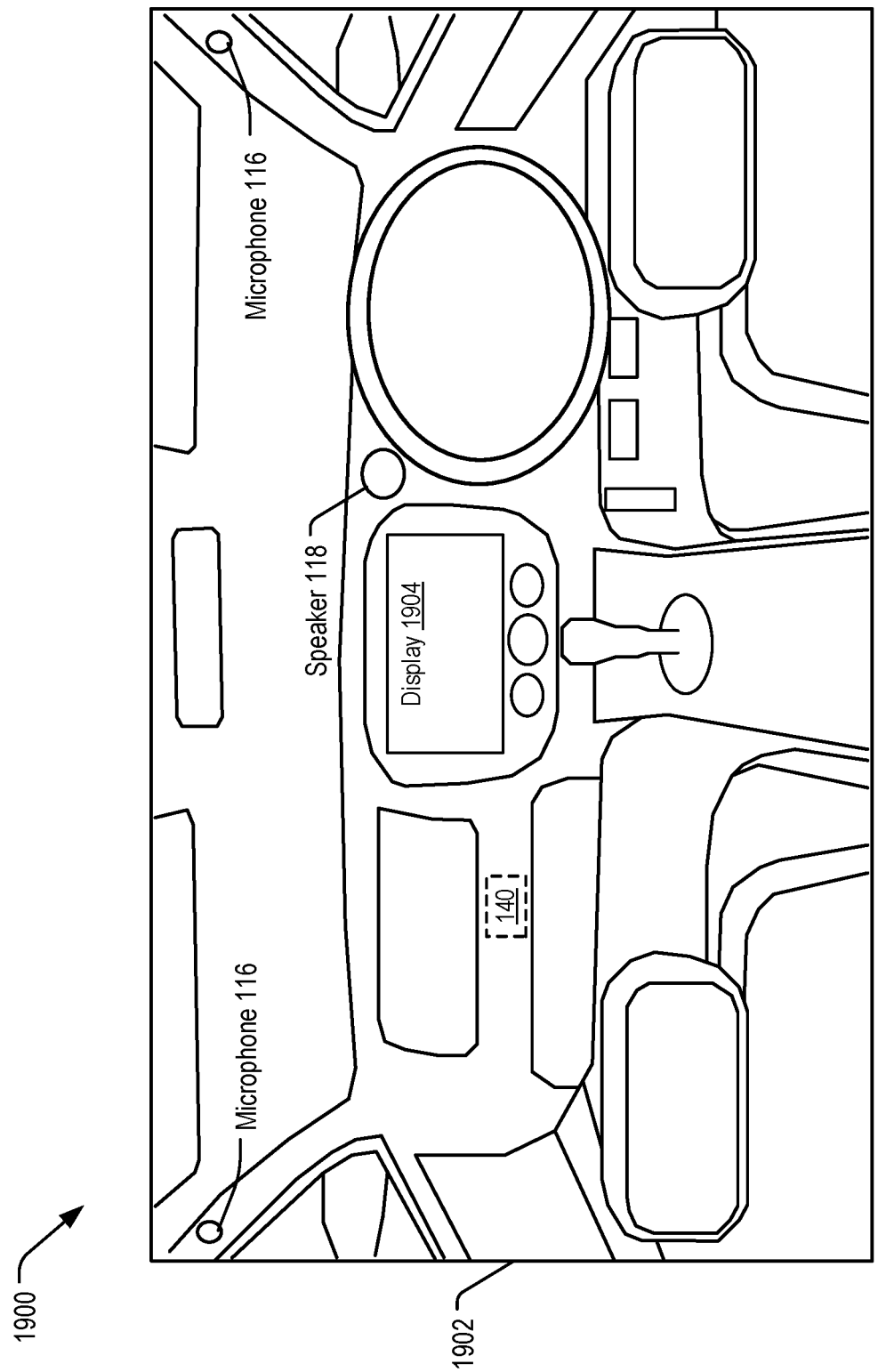
FIG. 19 is a diagram of a second example of a vehicle operable to facilitate application of a speech-based visual indicator to a video component of a communication session, in accordance with some examples of the present disclosure.

In another illustrative example, the communication session manager 140 is integrated in a vehicle that includes the microphone(s) 116 coupled to the processor(s) 190, and the microphone(s) 116 are configured to capture the particular speech of the participant to enable the participant to deliver a hands-free presentation with automatic visual indicators 152 during the communication session 130 while the participant is a user or occupant of the vehicle, such as described further with reference to FIG. 18 and FIG. 19. In other implementations, the communication session manager 140 can be integrated into other devices such as a mobile phone or tablet device (e.g., FIG. 12), a wearable device (e.g., FIG. 14), a wireless speaker and voice activated device (e.g., FIG. 15), or a camera device (e.g., FIG. 16), as illustrative, non-limiting examples.

One technical advantage of processing the audio component 132 and the video component 134 and adding the visual indicator 152 when a match is detected is that presenter of the communication session 130 can engage in a hands-free presentation that automatically provides visual emphasis to portions of the displayed slide(s) or page(s) that are currently being discussed. As a result, the presenter's hands are free to engage in other activities, such as holding notecards, gesturing, interacting with a keyboard or pointing device to search notes or perform internet searches, etc., during the presentation, while still providing the other participants with the functionality that is conventionally provided by a manually operated pointer to direct the viewers' attention. Further, the automatic insertion of the visual indicator 152 based on the topic 144 of discussion can provide a more accurate and reliable guide for viewers as compared to conventional manually operated pointers that the presenter may forget to update or which may drift from their intended locations, such as due to physical movement at the presenter's device. In addition, by processing the video component 134 to detect the objects 148, such as when the video component 134 is received as streaming video from a remote presenter, the video can be automatically enhanced at the receiving device by inserting the visual indicator 152 without requiring access to the source documents being displayed.

Figure 2:
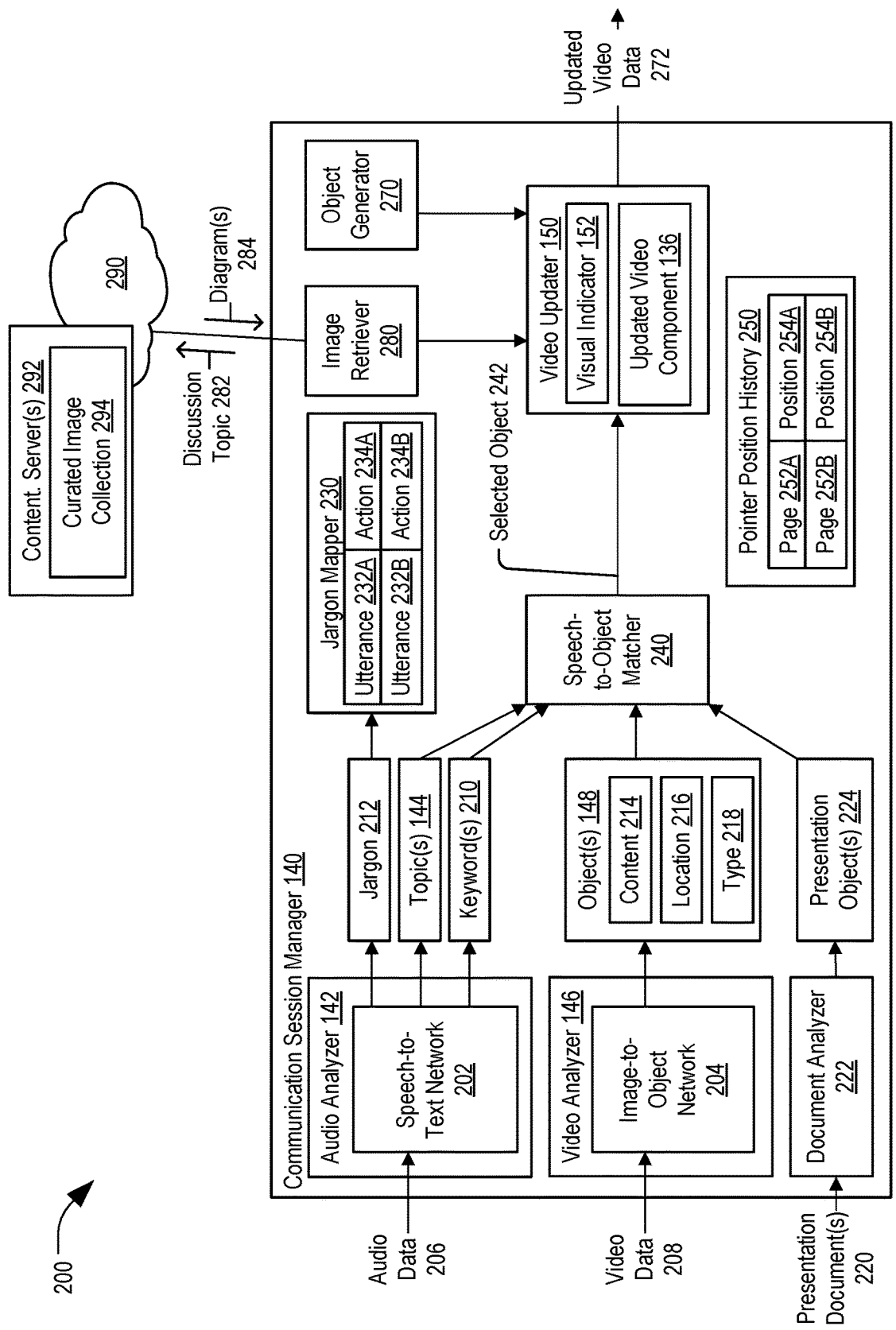
FIG. 2 is a diagram illustrating aspects associated with a communication session manager of the system of FIG. 1, in accordance with some examples of the present disclosure.

FIG. 2 is a diagram of an illustrative example 200 of components and operations associated with applying a speech-based visual indicator to a video component of a communication session, in accordance with some examples of the present disclosure. In the example 200 illustrated in FIG. 2, a communication session manager 140 (e.g., the communication session manager 140A) includes the audio analyzer 142, the video analyzer 146, and the video updater 150, and may optionally include one or more other components as described in more detail below.

The audio analyzer 142 is configured to use a speech-to-text network 202 to process audio data 206 to detect particular speech in the audio data 206. According to an aspect, the audio data 206 includes a representation of the audio component 132, such as the speech 112 of the person 110A, and the speech-to-text network 202 is configured to detect particular speech in the audio component 132. A particular example of the speech-to-text network 202 is described in further detail with reference to FIG. 4.

Optionally, in some implementations, the speech-to-text network 202 is configured to detect one or more keywords 210 or one or more topics 144. For example the keywords 210 can correspond to a sequence of the individual words detected in the audio data 206, while the topic 144 can correspond to an overall topic of discussion that is generated based on analysis of the keywords 210. To illustrate, for a particular segment of speech, the keywords 210 may include the sequence of words "the next row of the table is the manager the manager is responsible for roles being executed effectively and successfully," while the topic 144 may be "manager."

The video analyzer 146 is configured to use an image-to-object network 204 to process video data 208 to detect one or more objects 148 in the video data 208. According to an aspect, the video data 208 includes a representation of the video component 134, and the image-to-object network 204 is configured to detect the one or more objects 148 in the video component 134. Optionally, for each of the detected object(s) 148, the image-to-object network 204 is configured to detect object content 214, an object location 216, an object type 218, or a combination thereof, for that object 148. In a particular implementation, the object content 214 includes text that is detected in the video data 208 and associated with the object 148, such as the text 158 of FIG. 1, the object location 216 indicates a position of the object 148 (e.g., coordinate locations identifying a bounding box or other segment of the video data 208 that includes the object 148), and the object type 218 identifies what kind of object has been detected, such as text, a bullet point, an element of a table (e.g., a table cell), or an element of a flow chart, a block diagram, a timeline, or one or more other graphical objects that can include, or be associated with, text in the video data 208. A particular example of the image-to-object network 204 is described in further detail with reference to FIG. 5.

Optionally, in some implementations, the communication session manager 140 includes a document analyzer 222 configured to, prior to a start of the communication session 130, analyze one or more presentation documents 220 associated with the communication session 130 to detect one or more presentation objects 224 in the presentation document(s) 220. For example, the presentation documents 220 may include one or more slide decks, formatted text documents, spreadsheets, etc., stored locally at the audio presenter's device 102 or accessed from network storage. The document analyzer 222 can be configured to parse metadata and content of the presentation document(s) 220 to generate a record of one or more presentation object(s) 224 in advance of presenting the presentation document(s) 220 during the communication session 130. Processing of the presentation document(s) 220 prior to the communication session 130 enables generation of data (e.g., content, location, and type) of each of the presentation object(s) 224 that coincides with the data for the objects 148 that would be extracted from the video data 208 if the presentation document(s) 220 were presented during the communication session 130. The presentation object(s) 224 are usable in place of the objects 148 identified by the video analyzer 146 so that, during the communication session 130, detection of an object that matches particular speech in the audio data 206 is at least partially based on a determination that at least one of the presentation object(s) 224 is associated with the particular speech.

In a particular example, the communication session manager 140 is configured to determine that the video data 208 corresponds to one or more slides or pages of the presentation document(s) 220, such as by detecting that the user (e.g., a person 110) is sharing one or more of the presentation document(s) 220 during the communication session 130, and in response the communication session manager 140 uses the previously determined presentation object(s) 224 and deactivates, powers down, or sets to a reduced power mode the image-to-object network 204, the video analyzer 146, or both. The document analyzer 222 therefore provides the technical advantage of reduced computational load and reduced power consumption as compared to operating the image-to-object network 204 of the video analyzer 146 to detect the objects 148 on-the-fly during the communication session 130.

The communication session manager 140 includes a speech-to-object matcher 240 that is configured to perform one or more comparisons of the particular speech detected in the audio data 206 (e.g., the topic(s) 144 or the keyword(s) 210) to the objects detected in the visual presentation accompanying the audio data 206 (e.g., the object(s) 148 or the presentation object(s) 224). In a particular example in which the audio analyzer 142 outputs the topic(s) 144 and the video analyzer 146 outputs the object(s) 148, the speech-to-object matcher 240 receives an indication of a most recently detected topic 144 from the audio analyzer 142 and compares the topic 144 to the content 214 of the object(s) 148. In another particular example in which the audio analyzer 142 outputs the topic(s) 144 and the presentation object(s) 224 are available, based on determining that the user is sharing one or more slides or pages of the presentation document(s) 220 during the communication session 130, the speech-to-object matcher 240, receives an indication of a most recently detected topic 144 from the audio analyzer 142 and compares the topic 144 to the content of the presentation object(s) 224 associated with the one or more slides or pages currently being shared. The speech-to-object matcher 240 generates an output including the object content 214, the object location 216, the object type 218, or a combination thereof, of the selected object 242 (e.g., the object 148 or the presentation object 224 that matches the particular speech) to the video updater 150.

The video updater 150 is configured to modify the video component 134 of the communication session 130 to generate the updated video component 136 by inserting the visual indicator 152 to emphasize the selected object 242. The updated video component 136 is output by the communication session manager 140 as updated video data 272. In some implementations, the video updater 150 is configured to use a single type of visual indicator 152, such as the pointer indicator 154, and a single position relative to the location of the selected object 242, such as positioned to the side of, above, or below the selected object 242. In other implementations, the video updater 150 determines a type of visual indicator 152 and a location of the visual indicator 152 at least partially based on the object type 218 and the object location 216 of the selected object 242.

As an illustrative, non-limiting example, when the object type 218 corresponds to text or a bullet point, the video updater 150 adds the visual indicator 152 as a pointer indicator 154 located to the left of the selected object 242 or centered under the selected object 242. In another illustrative, non-limiting example, when the object type 218 corresponds to table element, the video updater 150 adds the visual indicator 152 as a text effect that modifies an appearance of the text in the table element. In another illustrative, non-limiting example, when the object type 218 corresponds to text-containing graphical element, such as a block of a block diagram or flow chart, the video updater 150 adds the visual indicator 152 as highlighting within the graphical element. Determination of how and where to apply the visual indicator 152 can based on one or more default settings, based on one or more user-selected settings, or a combination thereof.

Optionally, in some implementations, the communication session manager 140 is configured to detect instances of jargon 212 in the audio data 206. (As used herein, "jargon" refers to particular utterances that are associated with particular actions or usages, such as "next slide" or "on the left side.") In such implementations, the speech-to-text network 202 is configured to detect one or more utterances 232 corresponding to jargon 212, which are provided to an optional jargon mapper 230 for processing. To illustrate, the speech-to-text network 202 may be configured to detect the jargon 212 by detecting, during the communication session 130, that the audio component 132 includes an utterance 232 that is mapped to a particular action 234 associated with a presentation document 220. For example, the jargon mapper 230 can include a list of utterances 232 that are mapped to respective actions 234, such as a first utterance 232A mapped to a first action 234A and a second utterance 232B mapped to a second action 234B. The speech-to-text network 202 may compare the generated keywords 210 detected in the audio data 206 to a list of the utterances 232 and, when a match is detected, may provide an indication of the detected utterance 232 to the jargon mapper 230. The jargon mapper 230 identifies the particular action 234 associated with the detected utterance 232, and the communication session manager 140 causes the particular action 234 to be performed. In some examples, the video updater 150 updates the video component 134 to depict a result of performance of the particular action 234. Examples of jargon utterances 232 and associated actions 234 are described in further detail with reference to FIG. 7.

Optionally, in some implementations, the communication session manager 140 includes an image retriever 280 that is configured to perform a search of one or more networks 290 to locate a diagram 284 (e.g., an image) associated with a discussion topic 282. For example, the communication session manager 140 may determine a discussion topic 282 based on the topic 144, the keywords 210, or both. If the discussion topic 282 is not located on the slide or page currently being displayed (e.g., no matching object 148 or matching presentation object 224 is found), and if the slide or page is determined to be blank (e.g., devoid of any objects) or is determined to have a designated area (also referred to as a field of view (FOV) panel) that is blank, the communication session manager 140 can cause the image retriever 280 to initiate a search for a diagram related to the discussion topic 282. In some implementations, the search is restricted to one or more content servers 292 that include a curated image collection 294 so that the retrieved diagram 284 is likely to be accurate and relevant to the discussion topic 282. As an illustrative, non-limiting example, the search may be restricted to a Wikipedia search (Wikipedia® is a registered trademark of Wikimedia Foundation, Inc.). The retrieved diagram 284 is provided to the video updater 150, and the video updater 150 updates the video component 134 (or the updated video component 136) to include the diagram 284 in the updated video component 136. Operation of the communication session manager 140 to identify and retrieve diagrams 284 based on discussion topics 282 for insertion into the video component 134 of the communication session 130 is described in further detail with reference to FIG. 8 and FIG. 9.

Optionally, in some implementations, the communication session manager 140 maintains a pointer position history 250. The pointer position history 250 includes one or more tables or other data structures in which, for each page 252, of a presentation document 220, that was previously displayed during the communication session 130, the pointer position history 250 tracks a position 254 of a most recent visual indicator 152 that was depicted on that page 252. For example, when a first page 252A was displayed previously, the last visual indicator 152 displayed on the first page 252A was at a first position 254A. Similarly, when a second page 252B was previously displayed, the last visual indicator 152 displayed on the second page 252B was at a second position 254B. As a result, when the presenter returns to a previously presented page during the communication session 130, the communication session manager 140 can access the pointer position history 250 and restore the visual indicator 152 to its previous state for that page. In an illustrative example, the presenter may state "go back to page 1," which may be identified as jargon 212 associated with a particular action 234 for re-displaying a particular page 252 of the previously displayed pages. In response, the communication session manager 140 may cause the video updater 150 to update the video component 134 to display the particular page 252 and to restore the most recent visual indicator 152 for the particular page 252. However, the pointer position history 250 is not necessarily limited to use with navigation instructions detected via jargon 212 and may instead, or in addition, be used in conjunction with manual navigation between pages by the presenter.

Optionally, the communication session manager 140 includes an object generator 270 configured to generate a representation of a presentation object on-the-fly when the presentation object is being described by the presenter but is not depicted on the currently presented page of a presentation document 220. For example, the communication session manager 140 may detect, during the communication session 130, that the audio component 132 includes a description of a component of a presentation object. To illustrate, the presenter may speak "let's learn about a block diagram of a central processing unit that includes a control unit, an arithmetic logic unit, and main memory" while no block diagram is identified in the currently displayed page (e.g., the objects 148 and/or the presentation objects 224 do not include graphical elements with text that include "central processing unit," "control unit," "arithmetic logic unit," or "main memory").

Based on determining that the component (e.g., a block including the text "control unit") of the presentation object (e.g., a block diagram of a central processing unit) is not present in the video component 134, and that the page is determined to be blank or is determined to have a designated area that is blank, the object generator 270 signals the video updater 150 to update the video component 134 to generate, in the updated video component 136, a representation of the component of the presentation object based on the description. In some implementations, the object generator 270 sends a description of the component to be added, such as the size and shape of the component, text to be added in the component, the position of the component, connections to other components that may already have been added, or a combination thereof. In this manner, the communication session manager 140 can generate a presentation object on-the-fly by iteratively adding components of a presentation object, such as elements of a flow chart, a timeline, or a block diagram, as the presenter is describing the components, as described further with reference to FIG. 10.

Figure 3:
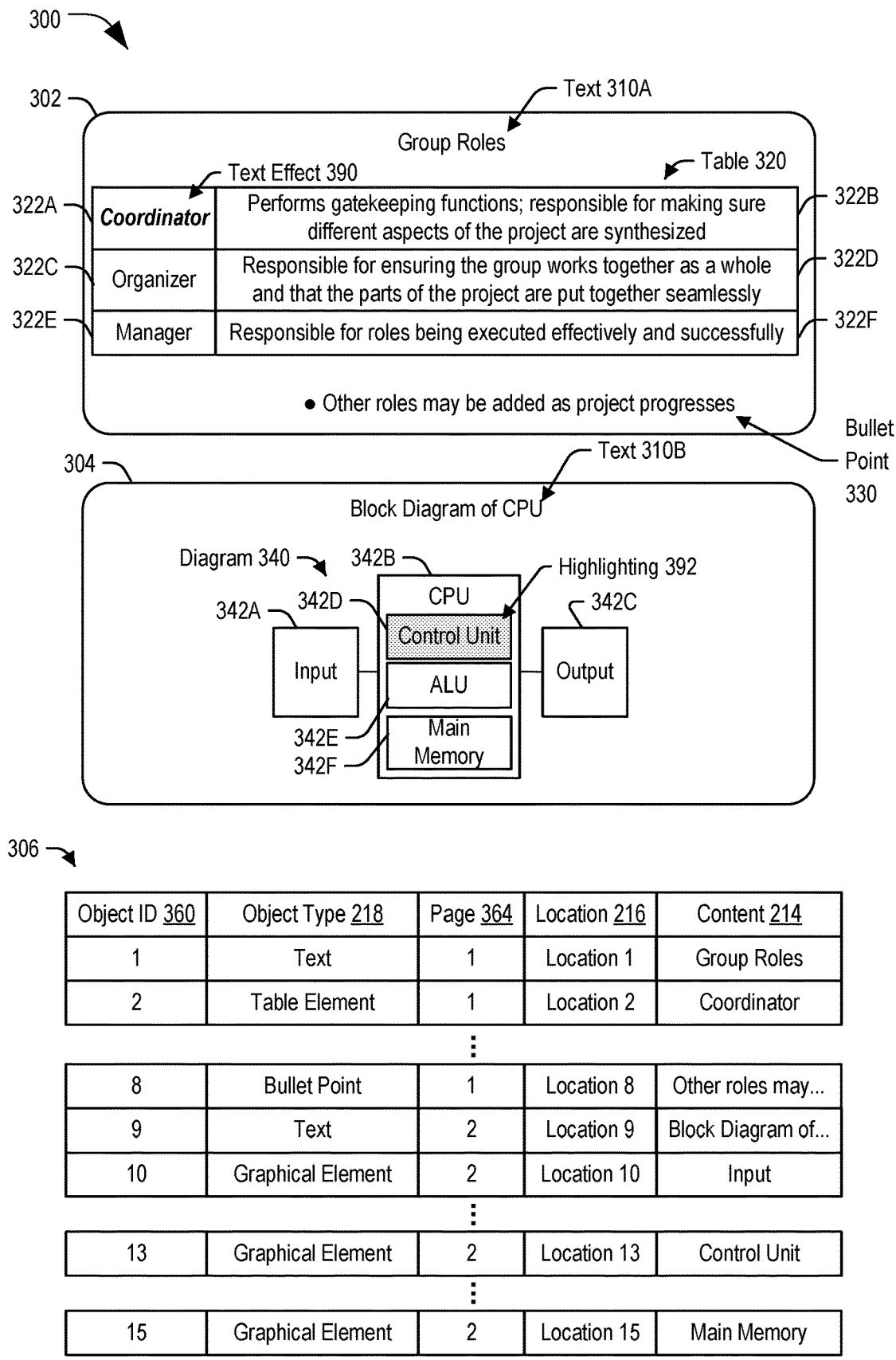
FIG. 3 is a diagram illustrating aspects associated with applying a speech-based visual indicator to a video component of a communication session, in accordance with some examples of the present disclosure.

FIG. 3 is a diagram 300 illustrating examples associated with applying a speech-based visual indicator to a video component of a communication session. In particular, FIG. 3 depicts a first page 302 and a second page 304 of a presentation document 220 that may be presented during the communication session 130 and also depicts an object database 306 (e.g., a table) that may be generated by the communication session manager 140 during the communication session 130.

The first page 302 includes text 310A, a table 320, and a bullet point 330. The text 310A corresponds to a title of the first page 302. The table 320 includes table elements 322 arranged in three rows and two columns. As illustrated, each row corresponds to an organizational role that can be assigned to a participant of a group. The top row includes a table element 322A that includes the text "Coordinator" and a table element 322B that includes a description of a coordinator role. The middle row includes a table element 322C that includes the text "Organizer" and a table element 322D that includes a description of an organizer role. The bottom row includes a table element 322E that includes the text "Manager" and a table element 322F that includes a description of a manager role. The bullet point 330 is located under the table 320 and includes additional information regarding group roles.

In a particular implementation, when the first page 302 is presented during the communication session 130, the video analyzer 146 processes the video component 134 corresponding to the first page 302 and identifies the text 310A, each of the six elements 322A-322F of the table 320, and the bullet point 330 as individual objects 148. The communication session manager 140 populates a separate row of the object database 306 with information of a respective one of the identified objects 148. As illustrated, a first row of the object database 306 is associated with the text 310A and includes an object identifier (ID) 360 of "1," an object type 218 of "text," a page indicator 364 of "1," an object location 216 that identifies the location of the text 310 (e.g., coordinates on the first page 302), and an object content 214 of "Group Roles." A second row through a seventh row of the object database 306 correspond to the table elements 322A-322F, respectively, and an eighth row of the object database 306 corresponds to the bullet point 330.

During the communication session 130 and while the first page 302 is being presented, the audio analyzer 142 processes the presenter's speech received as the audio component 132 to detect a topic 144. For example in response to the audio component 132 including the speech "The first role we are going to discuss is the coordinator. A good coordinator can directly affect the success or failure of the group, so take care in appointing someone as coordinator. As we can see, the responsibilities of the coordinator include . . . " the audio analyzer 142 determines that the topic 144 is "coordinator." The communication session manager 140 (e.g., the speech-to-object matcher 240) compares the topic 144 "coordinator" to the object content 214 of one or more of the objects 148 in the object database 306 until either a match is determined or until all entries for objects 148 in the first page 302 have been checked and determined to not match the topic 144. As illustrated, a match is determined for the object having object ID=2 and corresponding to the table element 322A, which has the object content 214 of "coordinator."

Although in this example the topic 144 and the object content 214 of the identified object have identical text (e.g., an exact match), in some implementations a match may be determined even though the topic 144 and the object content 214 are not identical. For example, the speech-to-object matcher 240 may determine a difference (or similarity) metric or a likelihood of a match, such as by direct calculation or using a network trained to estimate the difference (or similarity) metric or the likelihood, and may compare the difference (or similarity) metric or the likelihood to a threshold to determine whether a match is detected.

In response to determining the match, the video updater 150 applies the visual indicator 152 to the identified object by applying a text effect 390 to the text in the table element 322A. As illustrated, applying the text effect 390 includes modifying the text in the table element 322A to be boldfaced and italicized. In other examples, the text effect 390 can include other types of effects, such as changing underlining, text color, text size, font, or a combination thereof.

After discussing the first page 302, the presenter may proceed to another page in the presentation document 220 so that the second page 304 is presented. The second page 304 includes text 310B and a diagram 340. The text 310B corresponds to a title of the second page 304. The diagram 340 is a block diagram that includes multiple components (blocks), each of which corresponds to a graphical element (e.g., a rectangle) that includes text. As illustrated, a graphical element 342A includes the text "Input," a graphical element 342B includes the text "CPU," a graphical element 342C includes the text "Output." Graphical elements 342D, 342E, and 342F include the text "Control Unit," "ALU," and "Main Memory," respectively.

In a particular implementation, when the second page 304 is presented during the communication session 130, the video analyzer 146 processes the video component 134 corresponding to the second page 304 and identifies the text 310B and each of the six graphical elements 342A-342F of the diagram 340 as individual objects 148. The communication session manager 140 populates a separate row of the object database 306 with information of a respective one of the identified objects 148 of the second page 304. As illustrated, a ninth row of the object database 306 corresponds to the text 310B, and a tenth through a fifteenth row of the object database 306 correspond to the graphical elements 342A-342F, respectively.

During the communication session 130 and while the second page 304 is being presented, the audio analyzer 142 processes the presenter's speech received as the audio component 132 to detect a topic 144. For example in response to the audio component 132 including the speech "The CPU includes a control unit, and the control unit coordinates operations among the other component. For example, the control unit is responsible for . . . " the audio analyzer 142 determines that the topic 144 is "control unit." The communication session manager 140 (e.g., the speech-to-object matcher 240) compares the topic 144 "control unit" to the object content 214 of one or more of the objects 148 in the object database 306 until either a match is determined or until all entries for objects 148 in the second page 304 have been checked and determined to not match the topic 144. As illustrated, a match is determined for the object having object ID=13 and corresponding to the graphical element 342A, which has the object content 214 of "control unit."

In response to determining the match, the video updater 150 applies the visual indicator 152 to the identified object by applying highlighting 392 to the text in the graphical element 342D. As illustrated, applying highlighting 392 includes modifying a color of the area surrounding the text in the graphical element 342D to be visually distinct, such as by applying yellow highlighting 392.

Figure 4:
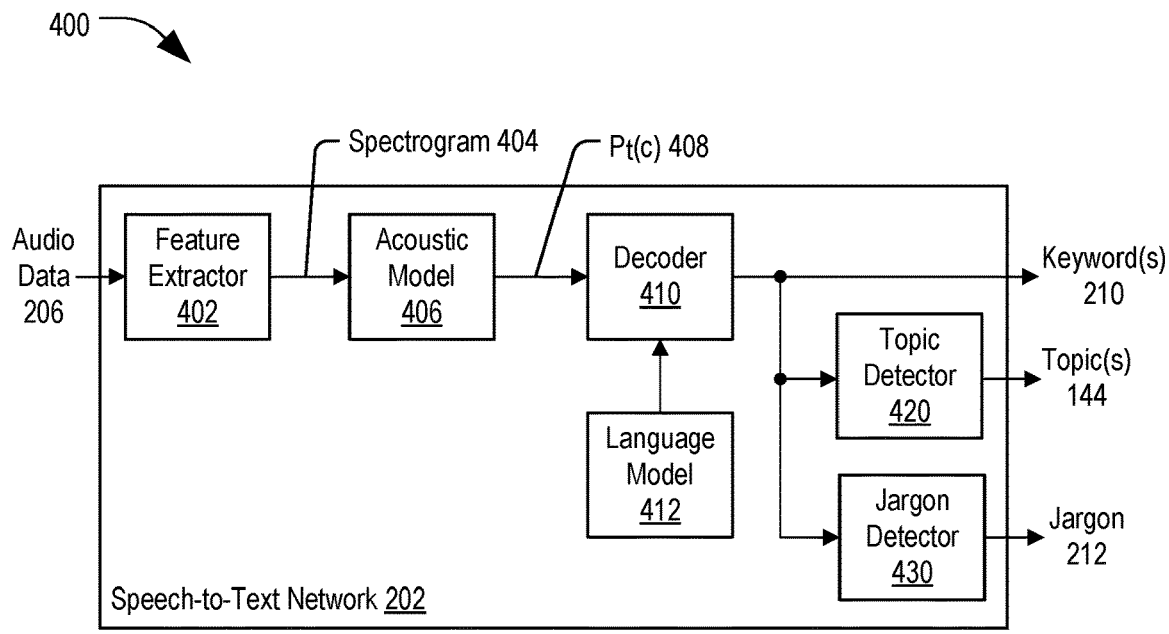
FIG. 4 is a diagram illustrating aspects associated with applying a speech-based visual indicator to a video component of a communication session, in accordance with some examples of the present disclosure.

FIG. 4 depicts an illustrative example 400 of the speech-to-text network 202 that may be included in the communication session manager 140. The speech-to-text network 202 includes a feature extractor 402 configured to process the audio data 206, such as using normalization, windowing, etc., and to generate feature data associated with the audio data 206, such as a spectrogram 404 (e.g., a log spectrogram or mel scale spectrogram). An acoustic model 406 is configured to process the feature data (e.g., the spectrogram 404) to determine the probability distributions $P_t(c)$ over vocabulary characters 'c' per each time step 't'. As an illustrative, non-limiting example, the acoustic model 406 can be implemented using a Jasper or Quartznet-type architecture.

A decoder 410 processes the output of the acoustic model 406 (e.g., the $P_t(c)$) to select letters, such as based on highest probability. A language model 412 is configured to guide the selection at the decoder 410 based on likelihoods of certain words appearing in context. The decoder 410 can thus generate text corresponding to the keywords 210 identified in the audio data 206 using automatic speech recognition processing techniques. A topic detector 420 is configured to process the keywords 210 to determine the topic(s) 144 associated with the audio data 206. Optionally, in some implementations, the speech-to-text network 202 also includes a jargon detector 430 configured to process the keywords 210 to identify one or more utterances that correspond to instances of jargon 212.

In some implementations, one or more (or all) of the feature extractor 402, the acoustic model 406, the decoder 410, the language model 412, the topic detector 420, or the jargon detector 430 is implemented as a trained model, such as a neural network. According to an aspect, the functionality associated with two or more of the feature extractor 402, the acoustic model 406, the decoder 410, the language model 412, the topic detector 420, or the jargon detector 430 can be combined into a single component. For example, in some implementations, the functionality described for the topic detector 420, the jargon detector 430, or both, can be included in the decoder 410.

Figure 5:
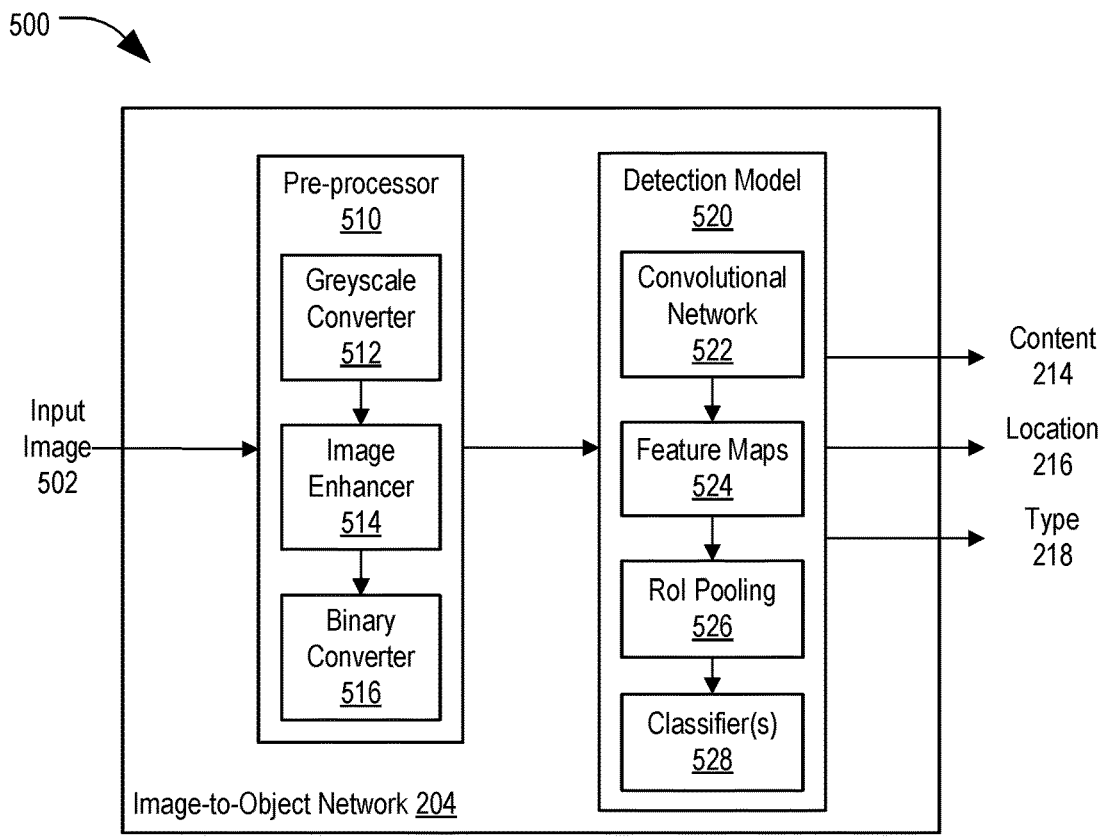
FIG. 5 is a diagram illustrating aspects associated with applying a speech-based visual indicator to a video component of a communication session, in accordance with some examples of the present disclosure.

FIG. 5 depicts an illustrative example 500 of the image-to-object network 204 that may be included in the communication session manager 140. The image-to-object network 204 includes a pre-processor 510 configured to process an input image 502 (e.g., a frame of a page included in the video data 208) and a detection model 520 configured to process the output of the pre-processor 510. The pre-processor 510 includes a greyscale converter 512 configured to convert the input image 502 to greyscale, an image enhancer 514 configured to perform one or more enhancement operations (e.g., contrast enhancement, noise removal) on the greyscale image to generate an enhanced greyscale image, and a binary converter 516 configured to perform a binary conversion operation on the enhanced greyscale image to generate a binary image that is output by the pre-processor 510.

The detection model 520 can correspond to a convolutional neural network (CNN) and, according to some aspects, is based on a ResNet18 architecture. The detection model 520 is configured to process the binary image using a convolutional neural network 522 to generate feature maps 524 associated with features of the binary image. The feature maps 524 may include one or more regions of interest (RoI) corresponding to segments of the binary image that include text. RoI pooling 526 may be performed to enable classification of arbitrary-sized regions of interest at one or more classifiers 528 configured to identify text. Each segment of the image that includes text can correspond to an object 148, where the identified text corresponds to the object content 214 and the segment position corresponds to the object location 216, and one or more of the classifiers 528 may be configured to detect the object type 218 associated with the segment. In an illustrative example, the detection model 520 can be trained using as input a set of images containing text to be recognized, and generating the sequence of characters of the detected text as the object content 214. The detection model 520 can further be trained to detect the location of an image segment that includes the detected text the object location 216, to detect the object type 218, or both. High accuracy performance of the detection model 520 can also be achieved using long short-term memory (LSTM) units.

Figure 6:
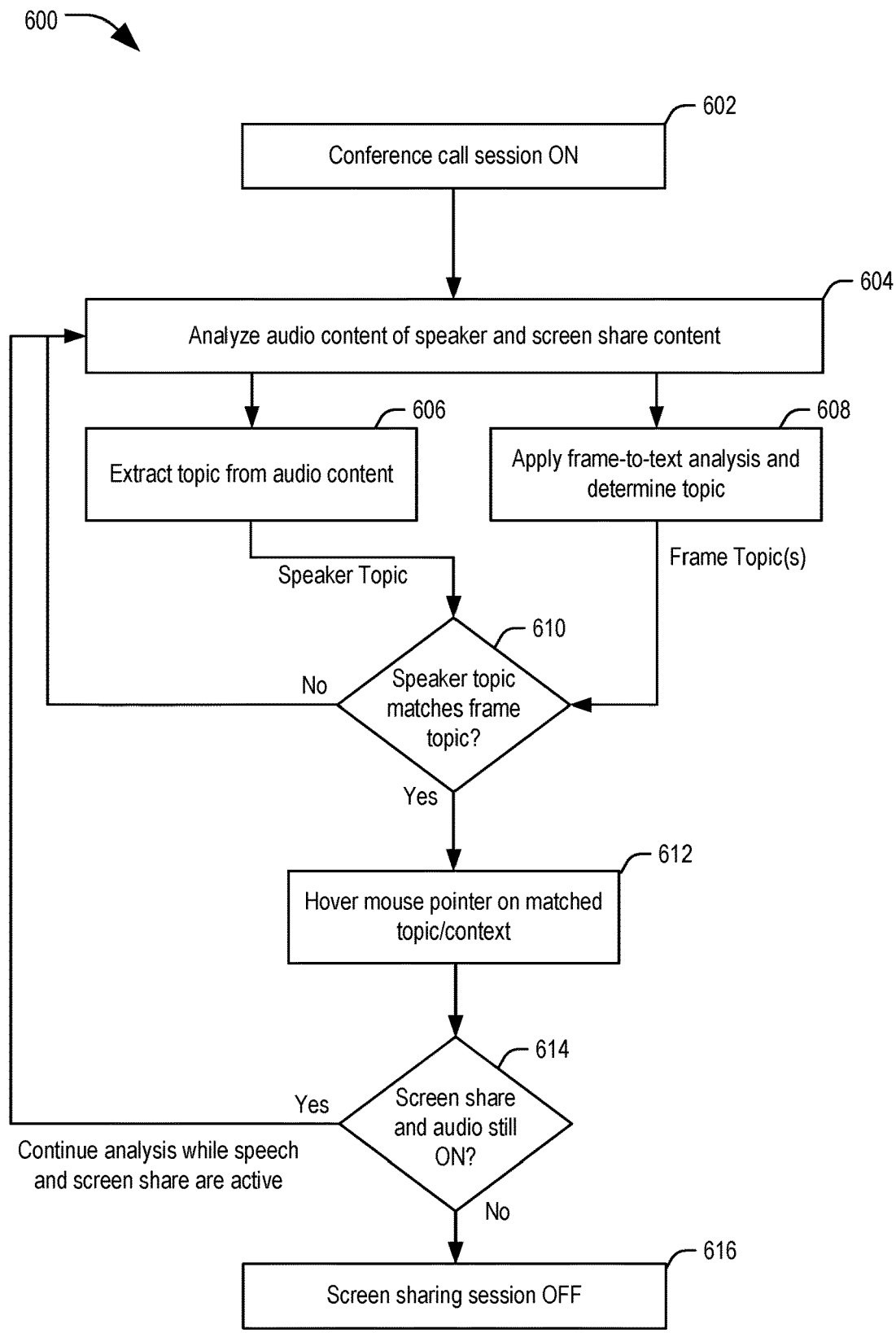
FIG. 6 is a diagram illustrating operations that may be performed by the communication session manager of the system of FIG. 1, in accordance with some examples of the present disclosure.

FIG. 6 depicts a flowchart of a particular implementation of a method 600 including operations that may be performed by a communication session manager 140.

The method 600 includes, at block 602, determining that a conference call session is initiated. For example, the conference call session may correspond to a particular instance of the communication session 130.

The method 600 includes, at block 604, analyzing audio content of a speaker (e.g., an audio presenter of the conference call session) and screen share content. For example, the audio content can correspond to the audio component 132 that is analyzed by the audio analyzer 142, and the screen share content can correspond to the video component 134 that is analyzed by the video analyzer 146.

The method 600 includes, at block 606, extracting a topic from the audio content. For example, the audio analyzer 142 may process the audio component 132 to extract the topic 144.

The method 600 includes, at block 608, applying frame-to-text analysis and determining one or more topics associated with the frame. For example, a frame of the video data 208 can include screen share content that corresponds to a page of a presentation document 220 and that is represented in the video component 134. The video component 134 is processed by the video analyzer 146 to determine the object(s) 148 associated with the frame. In other implementations, the one or more topics can be determined based on the presentation object(s) 224.

The method 600 includes, at block 610, determining whether the speaker topic matches the one or more frame topics. For example, the speech-to-object matcher 240 compares the topic 144 (from the audio content) to the object(s) 148 (or presentation object(s) 224) to see if the text associated with any of the object(s) 148 matches the topic 144. If no match is detected, the method 600 returns to analyzing the audio content and the screen share content at block 604.

Otherwise, when a match is detected, the method 600 includes, at block 612, hovering a mouse pointer on the matched topic/context. For example, the video updater 150 generates the updated video component 136 by inserting the pointer indicator 154 at or near the text of the matching object 148.

The method 600 includes, at block 614, determining whether the screen share and audio of the conference call session are still ongoing. In response to determining that the screen share and audio continuing are ongoing, the method 600 returns to analyzing the audio content and the screen share content at block 604, thus continuing analysis while the speech and screen share are active. Otherwise, the screen sharing session is deactivated, at block 616.

Figure 7:
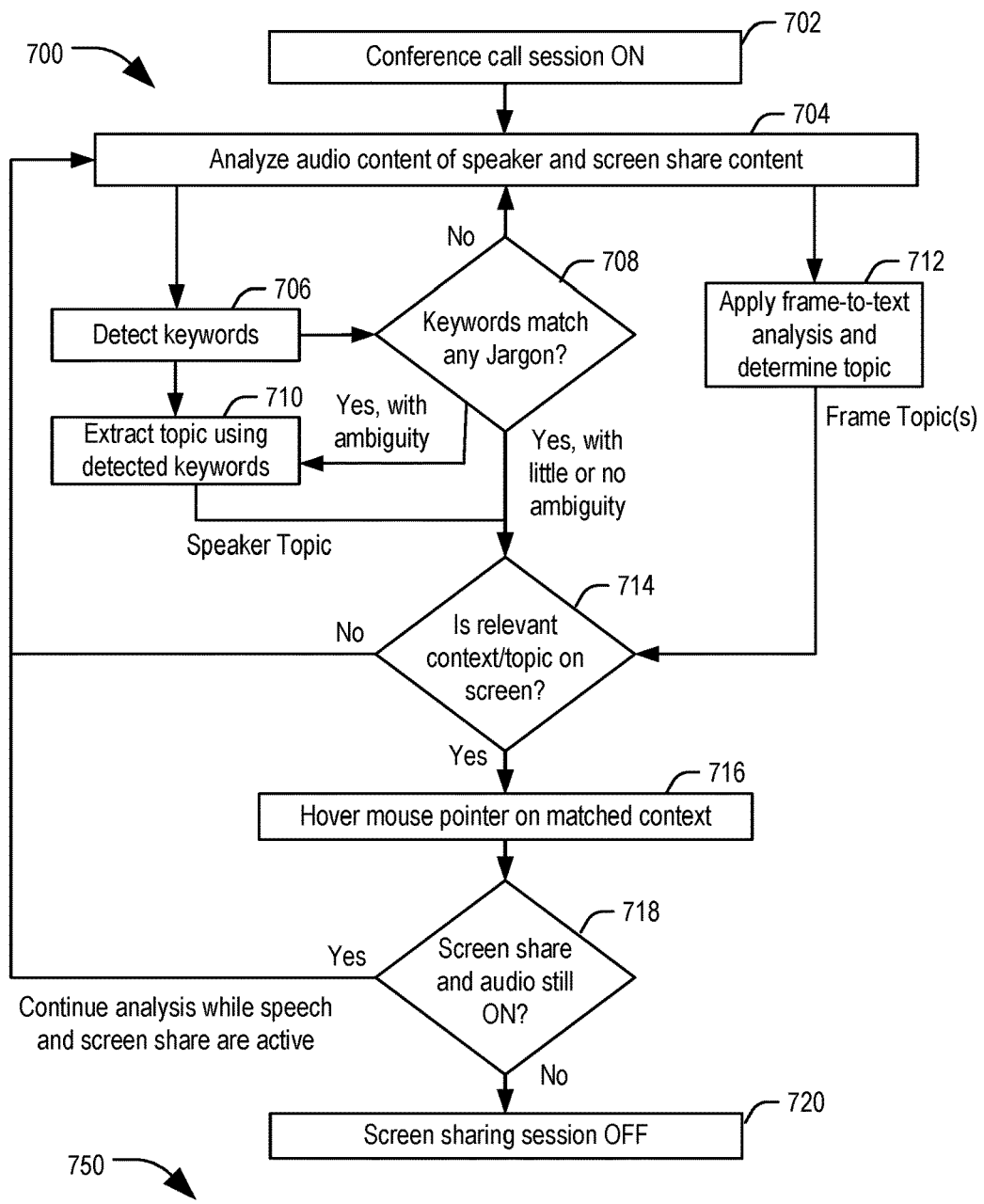
FIG. 7 is a diagram illustrating operations that may be performed by the communication session manager of the system of FIG. 1, in accordance with some examples of the present disclosure.

FIG. 7 is a diagram that includes a flowchart of a method 700 including operations that may be performed by a communication session manager 140 according to a particular implementation in which jargon detection is implemented.

The method 700 includes, at block 702, determining that a conference call session is initiated. For example, the conference call session may correspond to a particular instance of the communication session 130.

The method 700 includes, at block 704, analyzing audio content of a speaker (e.g., an audio presenter of the conference call session) and screen share content. For example, the audio content can correspond to the audio component 132 that is analyzed by the audio analyzer 142, and the screen share content can correspond to the video component 134 that is analyzed by the video analyzer 146.

The method 700 includes, at block 706, extracting keywords from the audio content. For example, the audio analyzer 142 may process the audio component 132 to extract the keywords 210.

The method 700 includes, at block 708, determining whether the keywords match any jargon. For example, the keywords 210 can be compared to a jargon database 750 to determine whether the keywords 210 match identified jargon that is associated with one or more particular actions or usages. The jargon database 750 includes multiple rows each corresponding to a respective utterance (or set of keywords) that is categorized as jargon, including values for a jargon ID 760, jargon 762, and an action/usage 764 of the jargon 762. According to an aspect, the jargon database 750 corresponds to the jargon mapper 230 of FIG. 2.

In response to detecting that the keywords match the jargon with little or no ambiguity (e.g., a "straight hit"), the method 700 advances to block 714. As a particular example in which the speaker has been discussing a particular bullet point in a displayed slide (e.g., the shared content) and a mouse pointer has been hovering at the particular bullet point, the keywords 210 can include the sequence of words "in the next point we see that . . . " These keywords, when used in a search of the jargon database 750, result in a non-ambiguous match with the jargon "next point" corresponding to the second row of the jargon database 750 and associated with the action or usage of hovering a mouse pointer at a next sequential bullet point in a displayed slide (e.g., the screen share content).

Another possibility is that the keywords are detected to match the jargon, but with more than a threshold amount of ambiguity. For example, the keywords 210 can include the sequence of words "in the next interesting point we see that . . . " which likely matches the jargon "next point" corresponding to the second row of the jargon database 750, but with sufficient ambiguity that the communication session manager 140 cannot predict with certainty that the next sequential bullet point in the slide is the "next interesting point" mentioned by the speaker. In such cases, the method 700 moves to block 710 for topic extraction. Otherwise, when no jargon match is detected for the keywords, jargon processing for that set of keywords ends, although non-jargon topic extraction and matching can continue in a similar manner as described in FIG. 6.

To illustrate, the method 700 includes, at block 710, extracting a topic using the detected keywords. For example, extracting the topic can be performed by the audio analyzer 142, such as at the topic detector 420 of the speech-to-text network 202 of FIG. 4. In the event that a jargon match with ambiguity was determined at block 708, information regarding the potential jargon match can be used to inform the topic extraction, the topic extraction can be used to resolve the ambiguous jargon match, or both. Continuing the above example in which it is unclear whether the next sequential bullet point in the slide is the "next interesting point," extraction of a topic that matches the text of the next sequential bullet point can confirm the jargon match. As another example, if the topic extraction is ambiguous, such as when the extracted topic can potentially match the next sequential bullet point or another object elsewhere on the slide (e.g., the text in a table or a block diagram), the potential jargon match with the next sequential bullet point can be used to resolve the ambiguity in favor of the next sequential bullet point.

The method 700 includes, at block 712, applying frame-to-text analysis and determining one or more topics associated with the frame. For example, a frame of the video data 208 can include screen share content that corresponds to a slide of a presentation document 220 and that is represented in the video component 134. The video component 134 is processed by the video analyzer 146 to determine the object(s) 148 associated with the frame. In other implementations, the one or more topics can be determined based on the presentation object(s) 224.

The method 700 includes, at block 714, determining whether relevant topic/context is on screen. For example, if the mouse pointer is currently hovering at a bullet point and the block 174 is reached via a "straight hit" jargon match to hover at a next sequential bullet point, a determination can be made as to whether a next sequential bullet point is present on screen via searching the detected frame topic(s) (e.g., the object(s) 148) for a next sequential bullet point, such as a bullet point located immediately below the current bullet point. In such cases, the determination at block 714 may be performed without consideration of the speaker topic (if any) that may have been extracted based on the keywords. In another example, the determination may be based on a jargon match that was resolved using the extracted speaker topic, as explained previously, and can involve comparison of the action/usage associated with the jargon with the extracted frame topic(s) (e.g., the object(s) 148 or the presentation object(s) 224). In another example the determination may be based on the extracted speaker topic, such as when no jargon match was found, such as by comparing the speaker topic to the frame topic(s), such as via the speech-to-object matcher 240 comparing the topic 144 (from the audio content) to the object(s) 148 (or the presentation object(s) 224) to see if the text associated with any of the object(s) 148 (or the presentation object(s) 224) matches the topic 144.

If the relevant topic/context is not detected on screen, the method 700 returns to analyzing the audio content and the screen share content at block 704. Otherwise, when the relevant topic/context is detected on screen, the method 700 includes, at block 716, hovering a mouse pointer on the matched topic/context. For example, the video updater 150 generates the updated video component 136 by inserting the pointer indicator 154 at a position at or near the text of the selected object 242 (e.g., a next selected bullet point, or other text matching the speaker topic).

The method 700 includes, at block 718, determining whether the screen share and audio of the conference call session are still ongoing. In response to determining that the screen share and audio continuing are ongoing, the method 700 returns to analyzing the audio content and the screen share content at block 704, thus continuing analysis while the speech and screen share are active. Otherwise, the screen sharing session is deactivated, at block 720.

Figure 8:
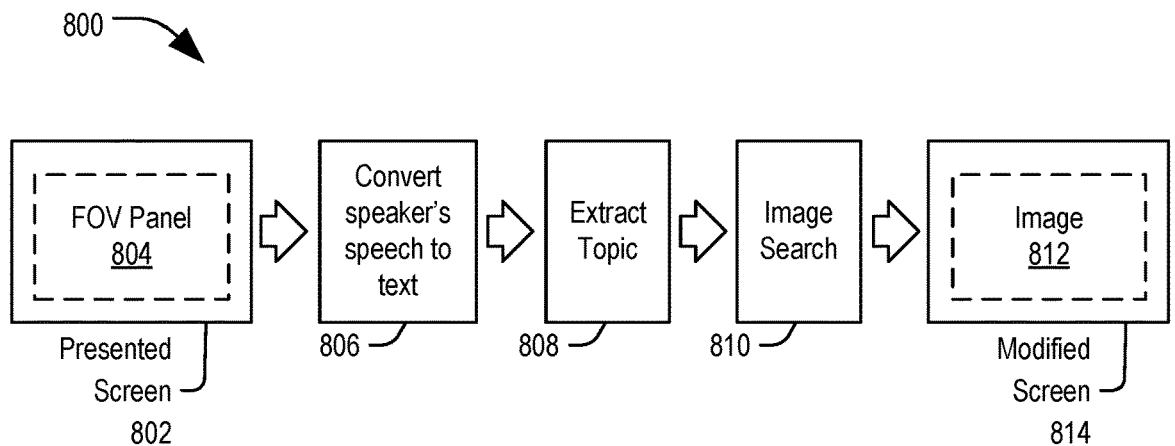
FIG. 8 is a diagram illustrating operations that may be performed by the communication session manager of the system of FIG. 1, in accordance with some examples of the present disclosure.

FIG. 8 is a diagram illustrating operations 800 that may be performed by a communication session manager 140 according to a particular implementation in which image retrieval is supported.

The operations 800 include detecting that a field of view panel 804 of a presented screen 802 is empty (e.g., blank, devoid of text or other objects 148). For example, a user starts presenting content (e.g., a slide of a presentation document 220) during a communication session 130, and the video analyzer 146 determines that the field of view panel 804 is devoid of any text or other objects 148 during processing of the video component 134, or the document analyzer 222 may be configured to make the determination during processing of the presentation document 220 (prior to a start of the communication session 130). In some implementations, the field of view panel 804 corresponds to a defined region encompassing a central portion of the presented screen and excluding peripheral regions that may include header text, footer text, a title, etc., of a presented slide. Although a single field of view panel is shown, according to some aspects, the presented screen 802 includes multiple field of view panels 804 that may each be evaluated for the presence of text or other objects 148.

The operations 800 include converting a speaker's speech to text, at block 806. For example, the image-to-object network 204 of the audio analyzer 142 extracts the keywords 210. As an illustrative example, the user may begin talking about the topic "fast Fourier transform," and the user's speech is converted to text (e.g., the keywords 210).

The operations 800 include extracting a topic based on the text, at block 808. For example, the topic detector 420 processes the keywords 210 to extract the topic 144. Continuing the illustrative example in which the user begins talking about fast Fourier transforms, the text corresponding to the user's speech is processed to extract the topic "fast Fourier transform."

The operations 800 include, once the topic is extracted, determining whether one or more objects associated with the extracted topic is present on the presented screen 802 and, when there is not an associated object (e.g., a diagram of a fast Fourier transform) detected on the screen 802, automatically retrieving a relevant image from a network (e.g., the internet) and inserting the retrieved image into the empty field of view panel 804, upon which the user can continue explaining the image. To illustrate, the image retriever 280 may search the content server(s) 292 for an image related to the discussion topic 282 (e.g., "fast Fourier transform"). A retrieved image 812 (e.g., a block diagram of an example fast Fourier transform algorithm structure) is provided to the video updater 150 for insertion into the empty field of view panel 804, resulting in a modified screen 814.

Figure 9:
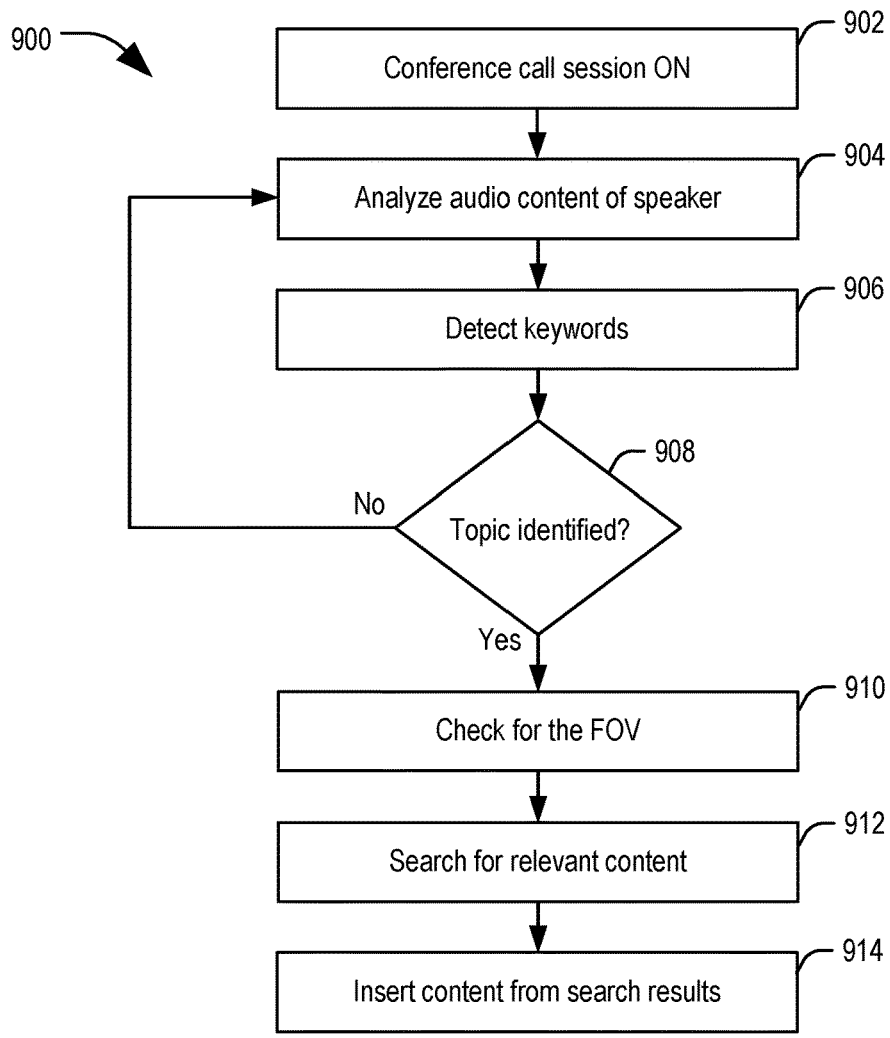
FIG. 9 is a diagram illustrating operations that may be performed by the communication session manager of the system of FIG. 1, in accordance with some examples of the present disclosure.

FIG. 9 is a diagram that includes a flowchart of a method 900 including operations that may be performed by a communication session manager 140 according to a particular implementation in which image retrieval is supported.

The method 900 includes, at block 902, determining that a conference call session is initiated. For example, the conference call session may correspond to a particular instance of the communication session 130.

The method 900 includes, at block 904, analyzing audio content of a speaker (e.g., an audio presenter of the conference call session). For example, the audio content can correspond to the audio component 132 that is analyzed by the audio analyzer 142.

The method 900 includes, at block 906, detecting keywords in the audio content. For example, the audio analyzer 142 may process the audio component 132 to extract the keywords 210.

The method 900 includes, at block 908, determining whether a topic is identified based on the detected keywords. For example, the audio analyzer 142 (e.g., the topic detector 420 of the speech-to-text network 202 of FIG. 4) may process the keywords 210 to determine whether a topic 144 is identified. In the event that a topic is not identified, the method returns to block 904, where analysis of audio content continues to be performed.

Otherwise, when a determination is made that a topic is identified, at block 908, the method 900 includes checking for the field of view, at block 910. Checking for the field of view can include detecting whether a field of view panel in a displayed page is empty, such as described for the field of view panel 804 of the presented screen 802 of FIG. 8. In an illustrative example, the video analyzer 146 determines whether the field of view panel 804 is devoid of any text or other objects 148 during processing of the video component 134, or the document analyzer 222 may be configured to make the determination during processing of the presentation document 220.

The method 900 includes, at block 912, searching for relevant content. For example, the image retriever 280 may search the content server(s) 292 for content related to the identified topic (e.g., the discussion topic 282) after determining that the displayed page does not include content matching the identified topic.

The method 900 includes, at bock 914, inserting content from the search results. For example the image retriever 280 may receive a diagram 284 as a result of the search, which is provided to the video updater 150 for insertion into the empty field of view panel.

Figure 10:
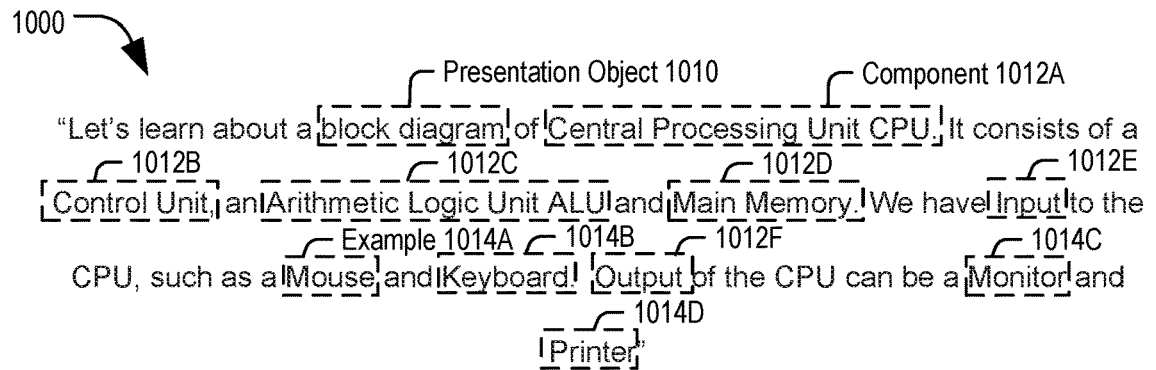
FIG. 10 is a diagram illustrating operations that may be performed by the communication session manager of the system of FIG. 1, in accordance with some examples of the present disclosure.
Figure 10:
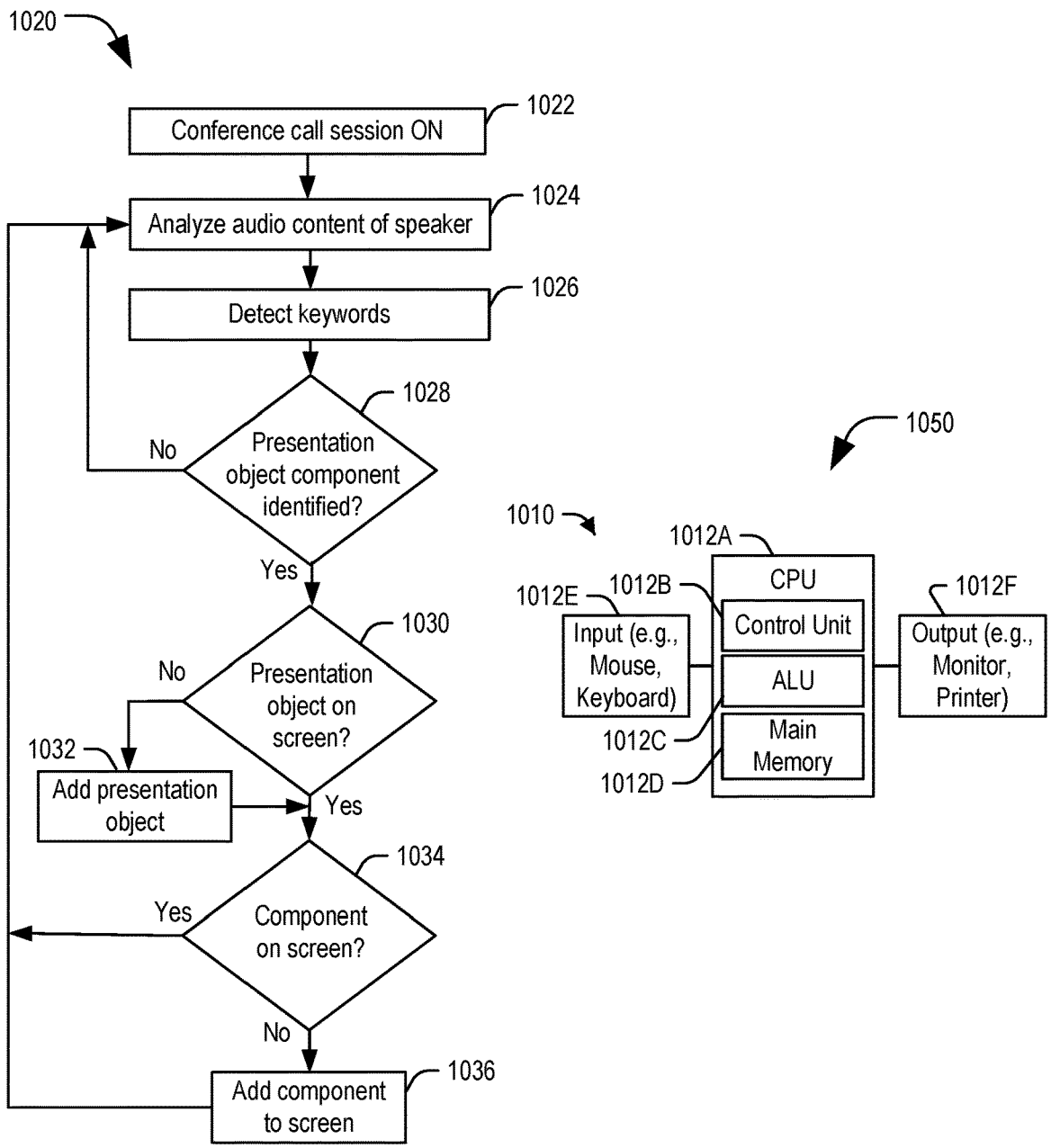

FIG. 10 is a diagram that illustrates operations that may be performed by a communication session manager 140 according to a particular implementation in which on-the-fly generation of presentation objects is supported.

For example, during a communication session 130, a user can present a slide and begin discussing an item that is not on the slide. For example, the user's speech can include a description 1000 of one or more components of a presentation object, such as a flow chart, a timeline, or a block diagram (as illustrative, non-limiting examples) although the described presentation object is not included in the displayed slide, and instead the slide has an empty field of view panel. The illustrated description 1000 depicts an example of words spoken by the user while the slide is displayed, and may correspond to keywords that are determined based on processing the user's speech.

The communication session manager 140 may perform a method 1020 that includes, at block 1022, determining that a conference call session is initiated. For example, the conference call session may correspond to a particular instance of the communication session 130.

The method 1020 includes, at block 1024, analyzing audio content of a speaker (e.g., an audio presenter of the conference call session). For example, the audio content can include the description 1000 and may correspond to the audio component 132 that is analyzed by the audio analyzer 142.

The method 1020 includes, at block 1026, detecting keywords in the audio content. For example, the audio analyzer 142 may process the audio component 132 to extract keywords 210 corresponding to (e.g., matching) the description 1000.

The method 1020 includes, at block 1028, determining whether a presentation object component is identified in the audio content. For example, the audio analyzer 142 or the object generator 270 may be configured to detect whether the keywords 210 include one or more terms that indicate that the speaker is describing a presentation object, such as the terms "flow chart," "timeline," or "block diagram," as illustrative, non-limiting examples. As an illustrative example, the implementation 1100 includes the term "block diagram" indicating a presentation object 1010.

When one or more terms that indicate a description of a presentation object are detected, the audio analyzer 142 or the object generator 270 process the keywords 210 to detect whether the keywords 210 include one or more terms that indicate a component of the presentation object. As an illustrative example, the component of the presentation object includes an element of a flow chart, a timeline, or a block diagram. In a particular implementation, detection of the one or more terms includes processing the keywords 210 using a trained machine learning model that is configured to identify presentation object components. For example, the implementation 1100 includes the term "central processing unit CPU" corresponding to a component 1012A, the term "control unit" corresponding to a component 1012B, the term "arithmetic logic unit ALU" corresponding to a component 1012C, the term "main memory" corresponding to a component 1012D, and the term "output" corresponding to a component 1012F.

In some implementations, the audio analyzer 142 or the object generator 270 are also configured to detect whether the keywords 210 include one or more terms that indicate component examples, such as by processing the keywords using a trained machine learning model configured to identify examples of identified presentation object components. For example, the description 1000 includes the terms "mouse" and "keyboard" corresponding to an example 1014A and an example 1014B, respectively, of the "input" component 1012E. The description 1000 also the terms "monitor" and "printer" corresponding to an example 1014C and an example 1014D, respectively, of the "output" component 1012F. In some implementations, the audio analyzer 142 or the object generator 270 includes a trained machine learning model configured to process the keywords 210 and generate an output indicating each presentation object, presentation object component, and component example in the keywords 210.

In response to determining that one or more presentation object components 1012 have been identified, at block 1028, the method 1020 advances to block 1030. Otherwise, the method 1020 returns to analyzing audio content of the speaker, at block 1024.

The method 1020 includes, at block 1030, determining whether the presentation object is on screen. For example, the video analyzer 146 may process the video component 134 to determine whether the identified presentation object (e.g., a block diagram corresponding to a CPU) is included in the slide being presented. If the presentation object is not on screen, at block 1030, the method 1020 includes adding the presentation object on screen, at block 1032. For example, the object generator 270 may instruct the video updater 150 to initialize generation of the identified presentation object in an empty field of view panel of the currently presented slide, such as by adding a title (e.g., "block diagram"), a border to enclose the block diagram, one or more initial blocks (e.g., one or more empty blocks), or a combination thereof.

The method 1020 includes, after determining that the presentation object is on-screen, at block 1030, or after adding the presentation object, at block 1032, determining whether each identified component of the presentation object is on screen, at block 1034. For example the video analyzer 146, the object generator 270, or both, may be configured to determine, for each of the identified components 1012, whether that component has already been added to the presentation object on the screen. If all of the presentation object components identified in the keywords 210 are determined to have been added to the presentation object on the screen (e.g., the block diagram includes a block for each of the components 1012 identified in the keywords 210), the method 1020 returns to analyzing next audio content of the speaker, at block 1024.

Otherwise, when one or more of the presentation object components identified in the keywords 210 are determined to have not been added to the presentation object on the screen (e.g., the block diagram does not include a block for each of the components 1012 identified in the keywords), the method 1020 includes, at block 1036, adding each such component to the screen. For example, the object generator 270 causes the video updater 150 to add each missing component 1012 to the presentation object 1010.

FIG. 10 also depicts an illustrative example of the presentation object 1010 that may be generated on-the-fly by the communication session manager 140 based on the speaker's description 1000. As illustrated, the presentation object 1010 is arranged as a block diagram with each of the components 1012 depicted as a block that includes text indicating the keyword(s) corresponding to that component 1012 (e.g., the component 1012A includes the keyword "CPU" and the component 1012E includes the keyword "Input"). In addition, text corresponding to each of the examples 1014 is added to the corresponding component 1012 (e.g., the component 1012E also includes the keywords "mouse" and "keyboard" corresponding to the examples 1014A and 1014B, respectively). Each of the blocks of the block diagram is either coupled to (e.g., via a connector line) or nested inside of another block of the block diagram, based on relationships between the components 1012 that may be determined via analysis of the description 1000.

Thus, performance of the method 1020 enables the communication session manager 140 detect, during the communication session 130, that the audio component 132 includes the description 1000 of a component 1012 of a presentation object 1010 and, based on determining that the component 1012 of the presentation object 1010 is not present in the video component 134, update the video component 134 to generate a representation of the component 1012 of the presentation object 1010 based on the description 1000.

Figure 11:
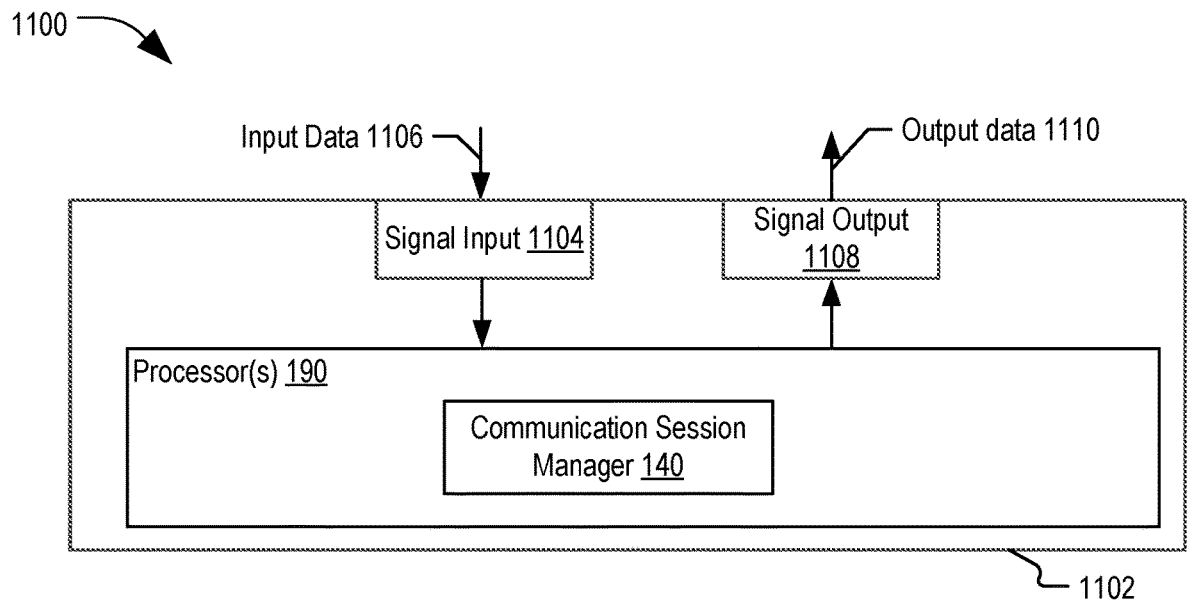
FIG. 11 illustrates an example of an integrated circuit operable to facilitate application of a speech-based visual indicator to a video component of a communication session, in accordance with some examples of the present disclosure.

FIG. 11 depicts an implementation 1100 in which an integrated circuit 1102 includes the one or more processors 190 of the device 102A of FIG. 1. The integrated circuit 1102 also includes a signal input 1104, such as one or more bus interfaces, to receive input data 1106 for processing. For example, the input data 1106 may include data from the communication circuitry 120 or the speaker(s) 118 of FIG. 1, such as the media stream 160 representing the audio component 132 and the video component 134, the input audio data 122 representing the speech 112 of the person 110A, or a combination thereof.

The integrated circuit 1102 also includes a signal output 1108, such as a bus interface, to enable sending of output data 1110. For example, the output data 1110 may include data provided by the processor(s) 190 to one or more of the communication circuitry 120, the speaker(s) 118, or the display device 104 of FIG. 1, such as the output audio data 124, the media stream 160 representing the audio component 132 and the video component 134 or the updated video component 136, the visual indicator 152, other data associated with the communication session 130, or a combination thereof.

Figure 12:
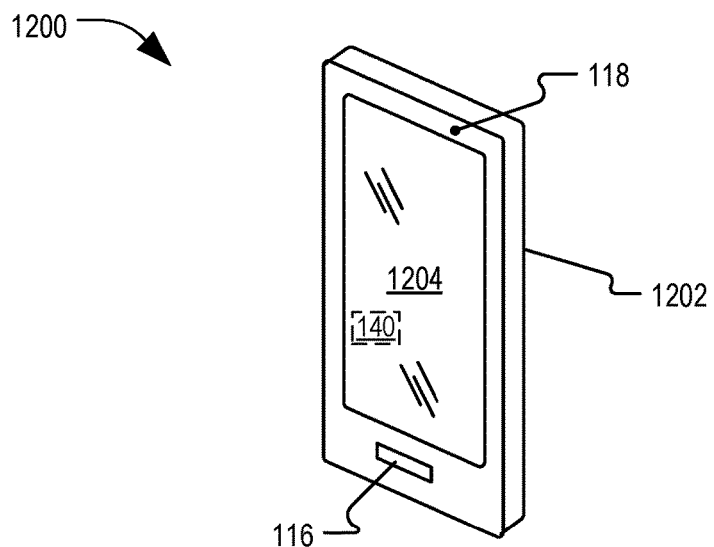
FIG. 12 is a diagram of a mobile device operable to facilitate application of a speech-based visual indicator to a video component of a communication session, in accordance with some examples of the present disclosure.

FIG. 12 depicts an implementation 1200 in which one of the devices 102 of FIG. 1 is a mobile device 1202, such as a phone or tablet, as illustrative, non-limiting examples. The mobile device 1202 includes the microphone(s) 116, the speaker(s) 118, and a display screen 1204 (e.g., the display device 104). A communication session manager 140 is integrated in the mobile device 1202 and illustrated using dashed lines to indicate internal components that are not generally visible to a user of the mobile device 1202.

In a particular example, the mobile device 1202 is operable to automatically apply a speech-based visual indicator to a video component 134 of a communication session 130. To illustrate, when a user of the mobile device 1202 is an audio presenter during the communication session 130, the user's speech may be captured by the microphone(s) 116 and processed to identify text (or some other element) of a shared document that the user is speaking about, and a pointer indicator 154 (or other visual indicator 152) is added to emphasize or direct a viewer's attention to the identified text or element. The resulting updated video component 136 can be transmitted to one or more other devices associated with the communication session 130, such as one or more end-user device, communication session server, display device (e.g., a projection device for a class or seminar), or a combination thereof. In addition, the updated video component 136 may also be displayed at the display screen 1204. The mobile device 1202 thus enables the user to conduct a hands-free presentation in which the pointer indicator 154 is automatically added and updated responsive to the content of the user's speech.

In implementations in which the user of the mobile device 1202 is not the audio presenter, such as when the mobile device 1202 receives the presenter's speech via a media stream, the communication session manager 140 can process the presenter's speech, identify the text or other visual element that the presenter is speaking about, and add the pointer indicator 154 or other visual indicator 152 for display at the display screen 1204 while the presenter's speech is played out via the speaker(s) 118.

Figure 13:
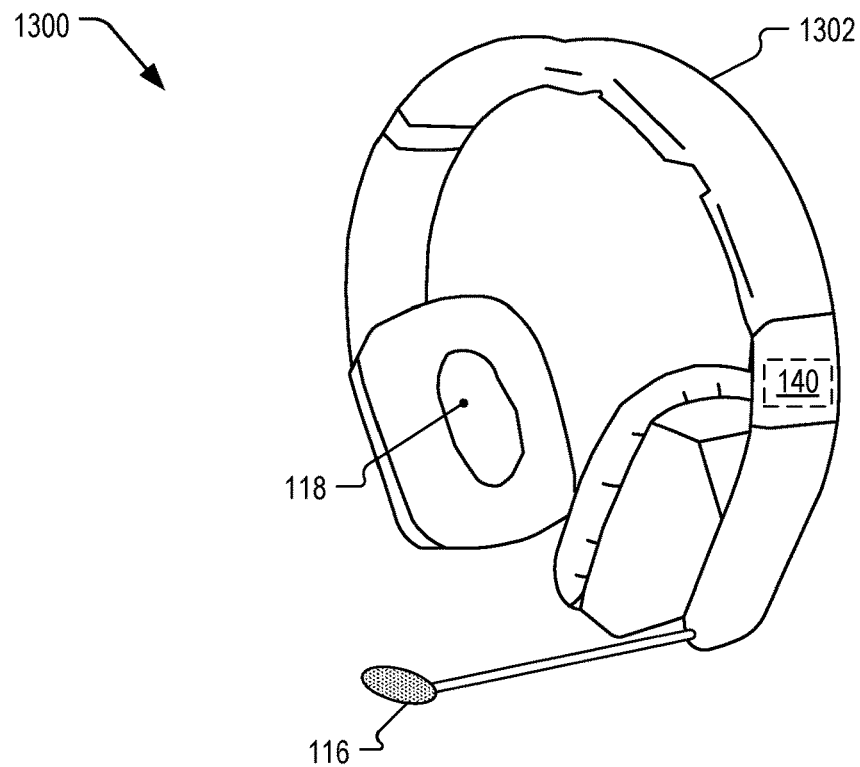
FIG. 13 is a diagram of a headset operable to facilitate application of a speech-based visual indicator to a video component of a communication session, in accordance with some examples of the present disclosure.

FIG. 13 depicts an implementation 1300 in which one of the devices 102 of FIG. 1 is a headset device 1302. Components of the processor 190, including the communication session manager 140, are integrated in the headset device 1302. The headset device 1302 includes the microphone 116 and the speaker(s) 118. The microphone 116 is configured to capture the speech of a user of the headset device 1302 to enable the user to deliver a hands-free presentation with automatic visual indicators 152 during a communication session 130, such as while the user is engaged in physical activity. Although the headset device 1302 is depicted as an over-ear type headset device, in other implementations the headset device 1302 can be configured as an in-ear type headset device, such as a pair of earbuds.

In a particular example, the headset device 1302 is operable to automatically apply a speech-based visual indicator to a video component 134 of a communication session 130. To illustrate, when a user of the headset device 1302 is an audio presenter during the communication session 130, the user's speech may be captured by the microphone 116 and processed to identify text (or some other element) of a shared document that the user is speaking about, and a pointer indicator 154 (or other visual indicator 152) is added to emphasize or direct a viewer's attention to the identified text or element. The resulting updated video component 136 can be transmitted to one or more other devices associated with the communication session 130, such as one or more end-user device, communication session server, display device (e.g., a projection device for a class or seminar), or a combination thereof. The headset device 1302 thus enables the user to conduct a hands-free presentation in which the pointer indicator 154 is automatically added and updated responsive to the content of the user's speech.

Figure 14:
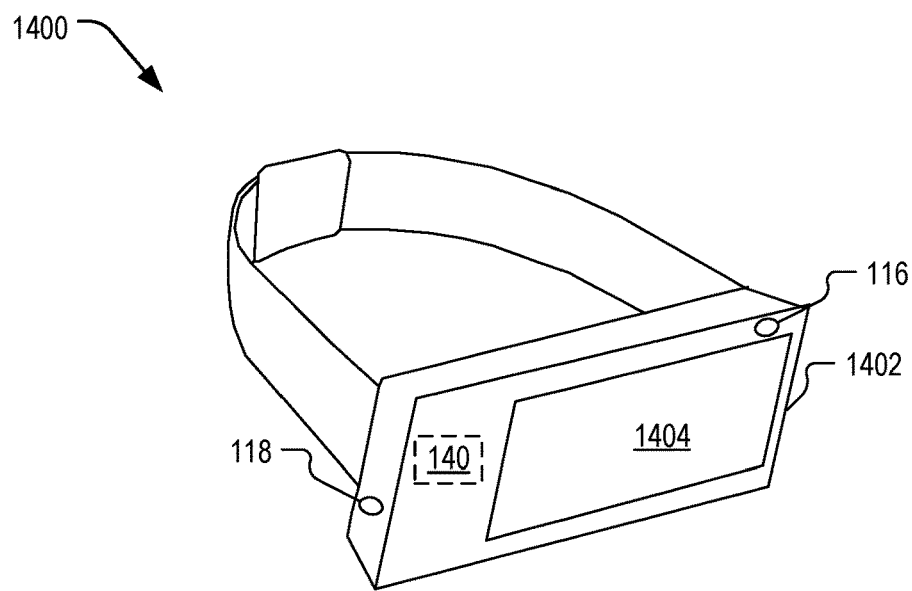
FIG. 14 is a diagram of a wearable electronic device operable to facilitate application of a speech-based visual indicator to a video component of a communication session, in accordance with some examples of the present disclosure.

FIG. 14 depicts an implementation 1400 in which one of the devices 102 of FIG. 1 is a wearable electronic device 1402, illustrated as a "smart watch." The wearable electronic device 1402 includes the microphone(s) 116, the speaker(s) 118, and a display screen 1404. Components of the processor(s) 190, including the communication session manager 140, are integrated in the wearable electronic device 1402.

In a particular example, the wearable electronic device 1402 is operable to automatically apply a speech-based visual indicator to a video component 134 of a communication session 130. To illustrate, when a user of the wearable electronic device 1402 is an audio presenter during the communication session 130, the user's speech may be captured by the microphone(s) 116 and processed to identify text (or some other element) of a shared document that the user is speaking about, and a pointer indicator 154 (or other visual indicator 152) is added to emphasize or direct a viewer's attention to the identified text or element. The resulting updated video component 136 can be transmitted to one or more other devices associated with the communication session 130, such as one or more end-user device, communication session server, display device (e.g., a projection device for a class or seminar), or a combination thereof. In addition, the updated video component 136 may also be displayed at the display screen 1404. The wearable electronic device 1402 thus enables the user to conduct a hands-free presentation in which the pointer indicator 154 is automatically added and updated responsive to the content of the user's speech.

In implementations in which the user of the wearable electronic device 1402 is not the audio presenter, such as when the wearable electronic device 1402 receives the presenter's speech, and optionally screen share content, via a media stream, the communication session manager 140 can process the presenter's speech, identify the text or other visual element that the presenter is speaking about, and add the pointer indicator 154 or other visual indicator 152 for display at the display screen 1404 while the presenter's speech is played out via the speaker(s) 118.

Figure 15:
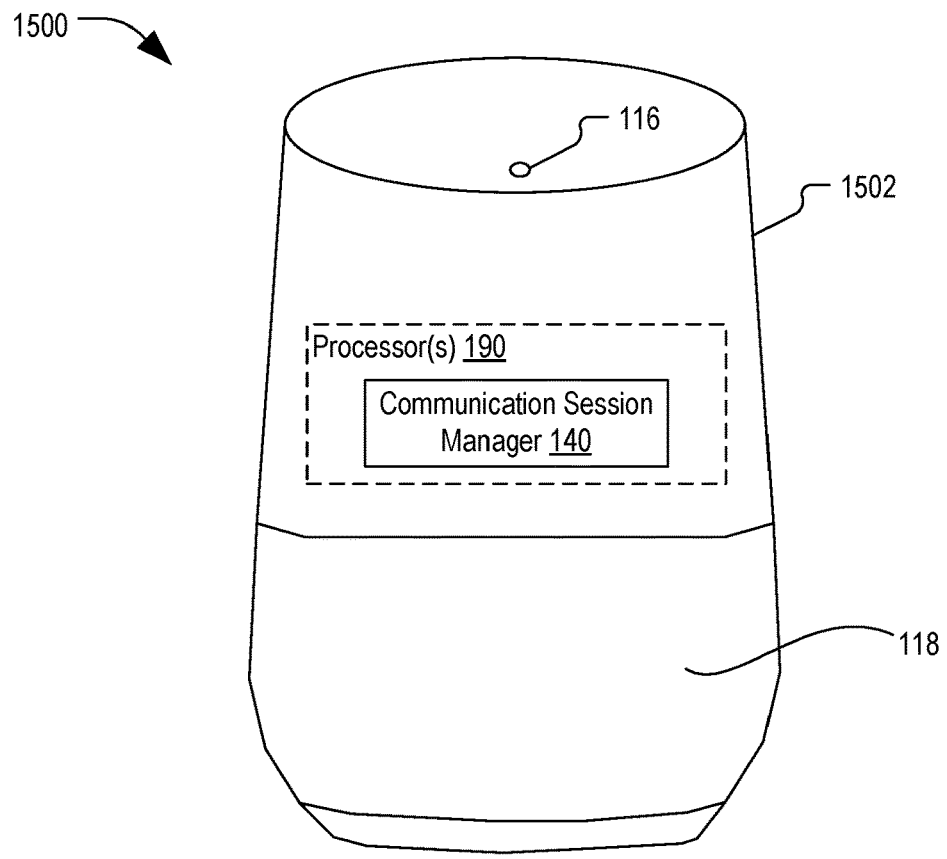
FIG. 15 is a diagram of a voice-controlled speaker system operable to facilitate application of a speech-based visual indicator to a video component of a communication session, in accordance with some examples of the present disclosure.

FIG. 15 is an implementation 1500 in which one of the devices 102 of FIG. 1 is a wireless speaker and voice activated device 1502. The wireless speaker and voice activated device 1502 can have wireless network connectivity and is configured to execute an assistant operation. The wireless speaker and voice activated device 1502 includes the microphone(s) 116 and the speaker(s) 118. Components of the processor(s) 190, including the communication session manager 140, are integrated in the wireless speaker and voice activated device 1502.

In a particular example, the wireless speaker and voice activated device 1502 is operable to automatically apply a speech-based visual indicator to a video component 134 of a communication session 130. To illustrate, when a user of the wireless speaker and voice activated device 1502 is an audio presenter during the communication session 130, the user's speech may be captured by the microphone(s) 116 and processed to identify text (or some other element) of a shared document that the user is speaking about, and a pointer indicator 154 (or other visual indicator 152) is added to emphasize or direct a viewer's attention to the identified text or element. The resulting updated video component 136 can be transmitted to one or more other devices associated with the communication session 130, such as one or more end-user device, communication session server, display device (e.g., a projection device for a class or seminar), or a combination thereof. In addition, the updated video component 136 may also be displayed at a local display, such as a display screen of the wireless speaker and voice activated device 1502 or a display device (e.g., a television) that is coupled to the wireless speaker and voice activated device 1502. The wireless speaker and voice activated device 1502 thus enables the user to conduct a hands-free presentation in which the pointer indicator 154 is automatically added and updated responsive to the content of the user's speech.

In implementations in which the user of the wireless speaker and voice activated device 1502 is not the audio presenter, such as when the wireless speaker and voice activated device 1502 receives the presenter's speech and screen share content via a media stream, the communication session manager 140 can process the presenter's speech, identify the text or other visual element that the presenter is speaking about, and add the pointer indicator 154 or other visual indicator 152 for display while the presenter's speech is played out via the speaker(s) 118.

Figure 16:
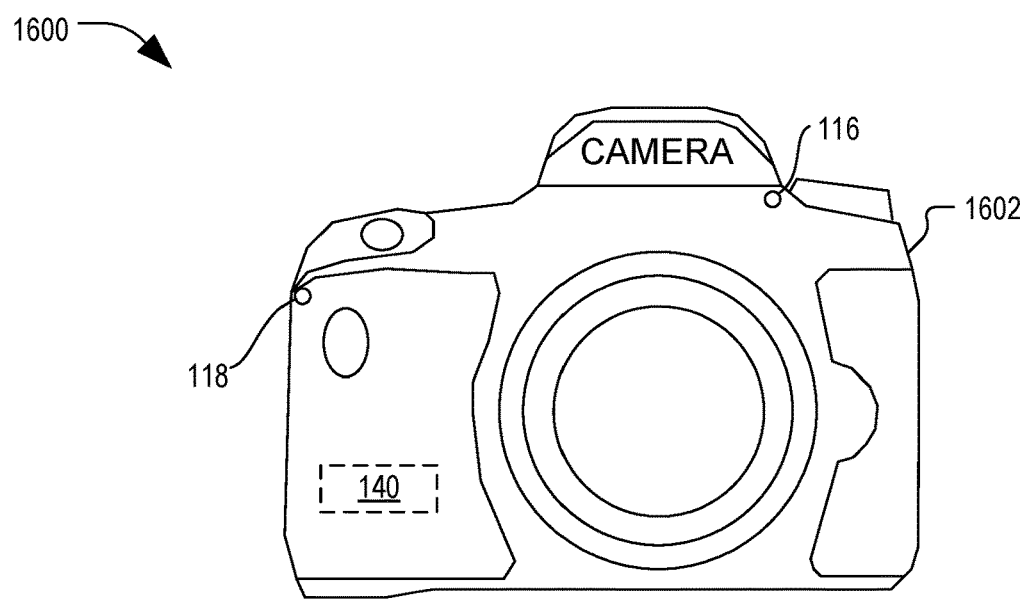
FIG. 16 is a diagram of a camera operable to facilitate application of a speech-based visual indicator to a video component of a communication session, in accordance with some examples of the present disclosure.

FIG. 16 depicts an implementation 1600 in which one of the devices 102 of FIG. 1 is a portable electronic device that corresponds to a camera device 1602. The camera device 1602 includes the microphone(s) 116, the speaker(s) 118, and optionally a display screen (e.g., on a side not visible in FIG. 16). Components of the processor(s) 190, including the communication session manager 140, are integrated in the camera device 1602.

In a particular example, the camera device 1602 is operable to automatically apply a speech-based visual indicator to a video component 134 of a communication session 130. To illustrate, when a user of the camera device 1602 is an audio presenter during the communication session 130, the user's speech may be captured by the microphone(s) 116 and processed to identify text (or some other element) of a shared document (e.g., a captured image) that the user is speaking about, and a pointer indicator 154 (or other visual indicator 152) is added to emphasize or direct a viewer's attention to the identified text or element. The resulting updated video component 136 can be transmitted to one or more other devices associated with the communication session 130, such as one or more end-user device, communication session server, display device (e.g., a projection device for a class or seminar), or a combination thereof. In addition, the updated video component 136 may also be displayed at a local display, such as the display screen of the camera device 1602. The camera device 1602 thus enables the user to conduct a hands-free presentation in which the pointer indicator 154 is automatically added and updated responsive to the content of the user's speech.

Figure 17:
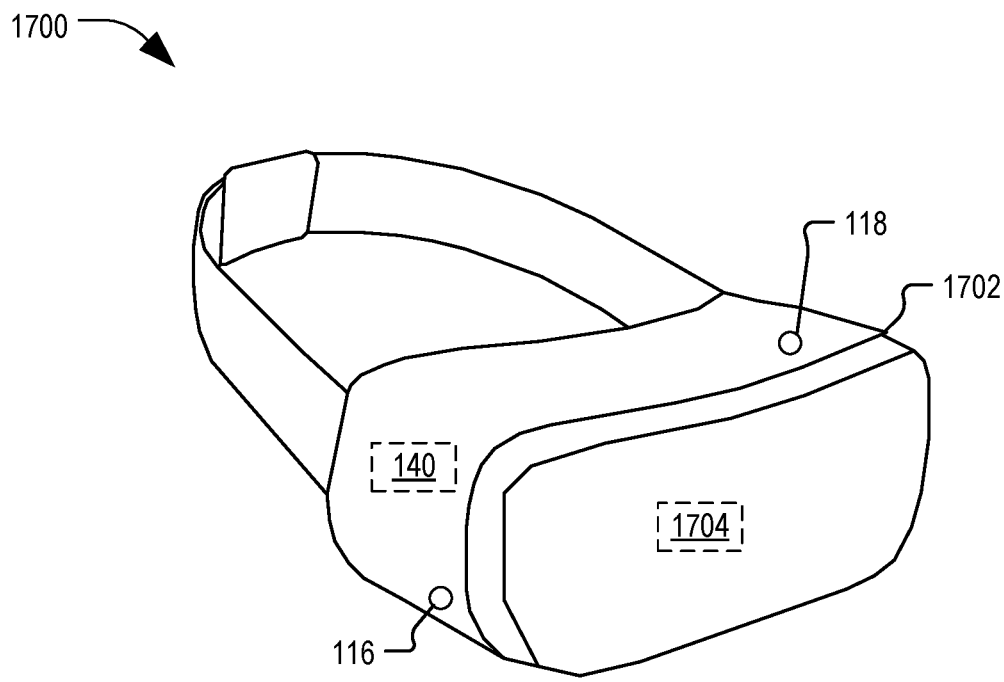
FIG. 17 is a diagram of an extended reality headset operable to facilitate application of a speech-based visual indicator to a video component of a communication session, in accordance with some examples of the present disclosure.

FIG. 17 depicts an implementation 1700 in which one of the devices 102 of FIG. 1 is a portable electronic device that corresponds to an extended reality headset 1702 (e.g., a virtual reality, mixed reality, or augmented reality headset). The extended reality headset 1702 includes the microphone(s) 116, the speaker(s) 118, and a display device 1704, such as a display screen disposed on a surface that is positioned in front of a user's eyes when the extended reality headset 1702 is worn. Components of the processor(s) 190, including the communication session manager 140, are integrated in the extended reality headset 1702.

In a particular example, the extended reality headset 1702 is operable to automatically apply a speech-based visual indicator to a video component 134 of a communication session 130, such as a virtual conference, seminar, or multi-participant extended reality session (e.g., a multi-player extended reality game). To illustrate, when a user of the extended reality headset 1702 is an audio presenter during the communication session 130, the user's speech may be captured by the microphone(s) 116 and processed to identify text (or some other element) of a shared document or a shared virtual object that includes text (e.g., a map or sign in a VR game) that the user is speaking about, and a pointer indicator 154 (or other visual indicator 152) is added to emphasize or direct a viewer's attention to the identified text or element. The resulting updated video component 136 can be transmitted to one or more other devices associated with the communication session 130, such as one or more end-user device, communication session server, display device (e.g., a projection device for a class or seminar), or a combination thereof. In addition, the updated video component 136 may also be displayed at the display device 1704. For example, the display device 1704 may be coupled to the processor(s) 190, and the processor(s) 190 may be configured to display the updated video component 136 at the display device 1704. The extended reality headset 1702 thus enables the user to conduct a hands-free presentation in which the pointer indicator 154 is automatically added and updated responsive to the content of the user's speech.

In implementations in which the user of the extended reality headset 1702 is not the audio presenter, such as when the extended reality headset 1702 receives the presenter's speech and shared content via a media stream, the communication session manager 140 can process the presenter's speech, identify the text or other visual element that the presenter is speaking about, and add the pointer indicator 154 or other visual indicator 152 for display at the display device 1704 while the presenter's speech is played out via the speaker(s) 118.

FIG. 18 depicts an implementation 1800 in which one of the devices 102 of FIG. 1 corresponds to, or is integrated within, a vehicle 1802, illustrated as a manned or unmanned aerial device (e.g., a drone capable of facilitating communication sessions, such as a conference call drone or an air taxi). The vehicle 1802 includes the microphone(s) 116 and the speaker(s) 118. Components of the processor(s) 190, including the communication session manager 140, are integrated in the vehicle 1802.

In a particular example, a user of the vehicle 1802 may be a participant in a communication session 130, and the vehicle 1802 is operable to automatically apply a speech-based visual indicator to a video component 134 of the communication session 130. For example, the microphone(s) 116 are configured to capture the particular speech of the participant to enable the participant to deliver a hands-free presentation with automatic visual indicators 152 during the communication session 130, such as while the participant is an occupant of the vehicle 1802. To illustrate, when a user of the vehicle 1802 is an audio presenter during the communication session 130, the user's speech may be captured by the microphone(s) 116 and processed to identify text (or some other element) of a shared document that the user is speaking about, and a pointer indicator 154 (or other visual indicator 152) is added to emphasize or direct a viewer's attention to the identified text or element. The resulting updated video component 136 can be transmitted to one or more other devices associated with the communication session 130, such as one or more end-user device, communication session server, display device (e.g., a projection device for a class or seminar), or a combination thereof. In addition, the updated video component 136 may also be displayed at a display screen (not shown). The vehicle 1802 thus enables the user to conduct a hands-free presentation in which the pointer indicator 154 is automatically added and updated responsive to the content of the user's speech.

In implementations in which the user of the vehicle 1802 is not the audio presenter, such as when the vehicle 1802 receives the presenter's speech and screen share content via a media stream, the communication session manager 140 can process the presenter's speech, identify the text or other visual element that the presenter is speaking about, and add the pointer indicator 154 or other visual indicator 152 for display at a display screen while the presenter's speech is played out via the speaker(s) 118.

FIG. 19 depicts another implementation 1900 in which one of the devices 102 of FIG. 1 corresponds to, or is integrated within, a vehicle 1902, illustrated as a car. The vehicle 1902 includes the processor 190 including the communication session manager 140. The vehicle 1902 also includes the microphone(s) 116, the speaker(s) 118, and a display screen 1904.

In a particular example, an occupant of the vehicle 1902 may be a participant in a communication session 130, and the vehicle 1902 is operable to automatically apply a speech-based visual indicator to a video component 134 of the communication session 130. For example, the microphone(s) 116 are configured to capture the particular speech of the participant to enable the participant to deliver a hands-free presentation with automatic visual indicators 152 during the communication session 130. To illustrate, when an occupant of the vehicle 1902 is an audio presenter during the communication session 130, the occupant's speech may be captured by the microphone(s) 116 and processed to identify text (or some other element) of a shared document that the occupant is speaking about, and a pointer indicator 154 (or other visual indicator 152) is added to emphasize or direct a viewer's attention to the identified text or element. The resulting updated video component 136 can be transmitted to one or more other devices associated with the communication session 130, such as one or more end-user device, communication session server, display device (e.g., a projection device for a class or seminar), or a combination thereof. In addition, the updated video component 136 may also be displayed at the display screen 1904. The vehicle 1902 thus enables the occupant to conduct a hands-free presentation in which the pointer indicator 154 is automatically added and updated responsive to the content of the occupant's speech.

In implementations in which the occupant of the vehicle 1902 is not the audio presenter, such as when the vehicle 1902 receives the presenter's speech and screen share content via a media stream, the communication session manager 140 can process the presenter's speech, identify the text or other visual element that the presenter is speaking about, and add the pointer indicator 154 or other visual indicator 152 for display at the display screen 1904 while the presenter's speech is played out via the speaker(s) 118.

Figure 20:
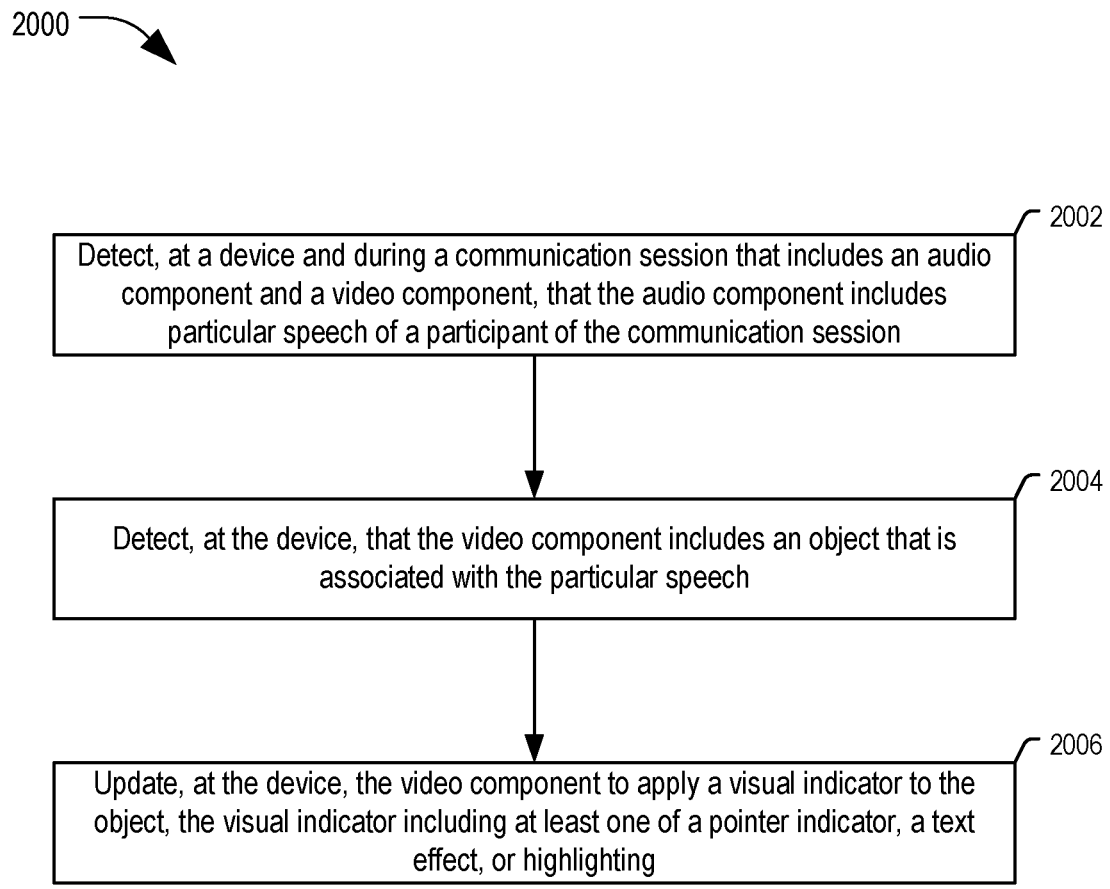
FIG. 20 is a diagram of a particular implementation of a method of applying a speech-based visual indicator to a video component of a communication session that may be performed by the device of FIG. 1, in accordance with some examples of the present disclosure.

Referring to FIG. 20, a particular implementation of a method 2000 of applying a speech-based visual indicator to a video component of a communication session is shown. In a particular aspect, one or more operations of the method 2000 are performed by at least one of the devices 102 of FIG. 1, the communication session server(s) 106, the communication session manager 140, the processor(s) 190, the system 100, or a combination thereof.

The method 2000 includes, at block 2002, detecting, at a device and during a communication session that includes an audio component and a video component, that the audio component includes particular speech of a participant of the communication session. For example, the audio analyzer 142 at the device 102A detects, during the communication session 130, that the audio component 132 includes particular speech corresponding to the topic 144.

The method 2000 includes, at block 2004, detecting, at the device, that the video component includes an object that is associated with the particular speech. For example, the video analyzer 146, the speech-to-object matcher 240, or both, process the video component 134 to detect the object(s) 148, and selects one of the object(s) 148 (e.g., the selected object 242) as corresponding to the topic 144. As another example, the document analyzer 222, the speech-to-object matcher 240, or both, process the presentation document(s) 220 to detect the presentation object(s) 224, and selects one of the presentation object(s) 224 (e.g., the selected object 242) as corresponding to the topic 144.

The method 2000 includes, at block 2006, updating, at the device, the video component to apply a visual indicator to the object, the visual indicator including at least one of a pointer indicator, a text effect, or highlighting. For example, the video updater 150 updates the video component 134 to generate the updated video component 136 by adding the visual indicator 152, such as the pointer indicator 154, the text effect 390, or the highlighting 392 to the selected object.

In some implementations, the method 2000 includes, during the communication session: processing the audio component to detect a discussion topic, performing a search of one or more data sources to locate a diagram associated with the discussion topic, and updating the video component to include the diagram. For example, the audio analyzer 142 processes the audio component 132 to determine the topic 144, which the image retriever 280 sends to the content server(s) 292 as the discussion topic 282 to conduct a search to locate the diagram(s) 284. The video updater 150 may then update the video component 134 to generate the updated video component 136 that includes the diagram 284.

In some implementations, the method 2000 includes, during the communication session, detecting that the audio component includes an utterance that is mapped to a particular action associated with a presentation document, and updating the video component to depict a result of performance of the particular action. For example, the audio analyzer 142 (e.g., the jargon detector 430) detects an utterance that is sent as the jargon 212 to the jargon mapper 230 (e.g., the jargon database 750), which maps the utterance to a particular usage or action (e.g., an action 234). The video updater 150 updates the video component 134 to depict a result of performance of the particular usage or action.

In some implementations, the method 2000 includes, during the communication session, detecting that the audio component includes a description of a component of a presentation object and, based on determining that the component of the presentation object is not present in the video component, updating the video component to generate a representation of the component of the presentation object based on the description. For example, the audio analyzer 142, the object generator 270, or both, may detect that the keywords 210 include the description 1000 of a component 1012 of the presentation object 1010. Based on a determination that the component 1012 of the presentation object 1010 is not present in the video component 134 (e.g., via comparison to the object(s) 148), the object generator 270 may cause the video updater 150 to generate a representation of the component 1012, such as described with reference to the block diagram 1050 of FIG. 10.

One technical advantage of the method 2000 is that presenter of the communication session 130 can engage in a hands-free presentation that automatically provides visual emphasis to portions of the displayed slide(s) or page(s) that are currently being discussed. As a result, the presenter's hands are free to engage in other activities, such as holding notecards, gesturing, interacting with a keyboard or pointing device to search notes or perform internet searches, etc., while the presentation is ongoing, while still providing the other participants with the functionality that is conventionally provided by a manually operated pointer to direct the viewers' attention. Further, the automatic insertion of the visual indicator based on the topic of discussion can provide a more accurate and reliable guide for viewers as compared to conventional manually operated pointers that the presenter may forget to update or which may drift from their intended locations, such as due to physical movement at the presenter's device. In addition, by processing the video component to detect the objects, such as when the video component is received as streaming video from a remote presenter, the video can be automatically enhanced at the receiving device by inserting the visual indicator without requiring access to the source documents being displayed.

The method 2000 of FIG. 20 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 2000 of FIG. 20 may be performed by a processor that executes instructions, such as described with reference to FIG. 21.

Figure 21:
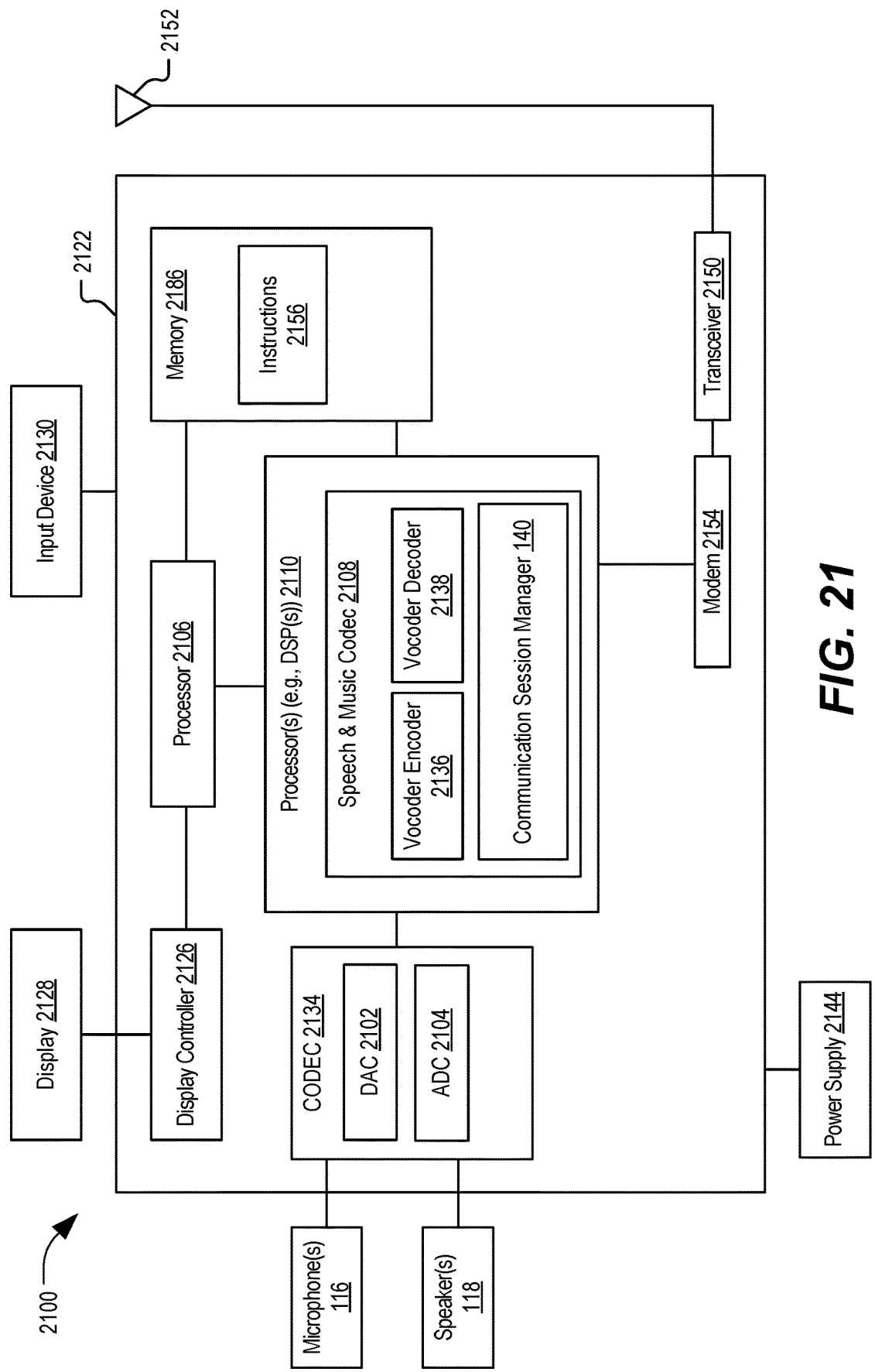
FIG. 21 is a block diagram of a particular illustrative example of a device that is operable to facilitate application of a speech-based visual indicator to a video component of a communication session, in accordance with some examples of the present disclosure.

Referring to FIG. 21, a block diagram of a particular illustrative implementation of a device is depicted and generally designated 2100. In various implementations, the device 2100 may have more or fewer components than illustrated in FIG. 21. In an illustrative implementation, the device 2100 may correspond to, include, or be included within one of the devices 102 of FIG. 1, or one of the communication session server(s) 106 of FIG. 1. In an illustrative implementation, the device 2100 may perform one or more operations described with reference to FIGS. 1-20.

In a particular implementation, the device 2100 includes a processor 2106 (e.g., a central processing unit (CPU)). The device 2100 may include one or more additional processors 2110 (e.g., one or more DSPs). In a particular aspect, the processor(s) 190 of FIG. 1 correspond to the processor 2106, the processor(s) 2110, or a combination thereof. The processor(s) 2110 may include a speech and music coder-decoder (CODEC) 2108 that includes a voice coder ("vocoder") encoder 2136, a vocoder decoder 2138, the communication session manager 140, or a combination thereof.

The device 2100 may include a memory 2186 and a CODEC 2134. The memory 2186 may include instructions 2156, that are executable by the one or more additional processors 2110 (or the processor 2106) to implement the functionality described with reference to the communication session manager 140.

The device 2100 may include a modem 2154 coupled, via a transceiver 2150, to an antenna 2152. In implementations in which the device 2100 corresponds to one of the devices 102 of FIG. 1, the modem 2154 corresponds to the modem 126 of FIG. 1.

The device 2100 may include a display 2128 coupled to a display controller 2126. In implementations in which the device 2100 corresponds to the device 102A of FIG. 1, the display 2128 corresponds to the display device 104, and the speaker(s) 118 and the microphone(s) 116 are coupled to the CODEC 2134. The CODEC 2134 may include a digital-to-analog converter (DAC) 2102, an analog-to-digital converter (ADC) 2104, or both. In a particular implementation, the CODEC 2134 may receive analog signals from the microphone(s) 116, convert the analog signals to digital signals using the analog-to-digital converter 2104, and provide the digital signals to the speech and music codec 2108. The speech and music codec 2108 may process the digital signals, and the digital signals may further be processed by the communication session manager 140. In a particular implementation, the speech and music codec 2108 may provide digital signals to the CODEC 2134. The CODEC 2134 may convert the digital signals to analog signals using the digital-to-analog converter 2102 and may provide the analog signals to the speaker(s) 118.

In a particular implementation, the device 2100 may be included in a system-in-package or system-on-chip device 2122. In a particular implementation, the memory 2186, the processor 2106, the processor(s) 2110, the display controller 2126, the CODEC 2134, the modem 2154, and optionally the transceiver 2150 are included in the system-in-package or system-on-chip device 2122. In a particular implementation, an input device 2130 and a power supply 2144 are coupled to the system-in-package or the system-on-chip device 2122. Moreover, in a particular implementation, as illustrated in FIG. 21, the display 2128, the input device 2130, the speaker(s) 118, the microphone(s) 116, the antenna 2152, and the power supply 2144 are external to the system-in-package or the system-on-chip device 2122. In a particular implementation, each of the display 2128, the input device 2130, the speaker(s) 118, the microphone(s) 116, the antenna 2152, and the power supply 2144 may be coupled to a component of the system-in-package or the system-on-chip device 2122, such as an interface or a controller.

The device 2100 may include a conference call or video call control device, a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an extended reality headset, an augmented reality headset, a mixed reality headset, a virtual reality headset, an aerial vehicle, a home automation system, a voice-activated device, a wireless speaker and voice activated device, a portable electronic device, a car, a computing device, a communication device, an internet-of-things (IoT) device, a virtual reality (VR) device, a base station, a mobile device, or any combination thereof.

In conjunction with the described implementations, an apparatus includes means for detecting, during a communication session that includes an audio component and a video component, that the audio component includes particular speech of a participant of the communication session. For example, the means for detecting that the audio component includes the particular speech can correspond to one of the devices 102, the processor(s) 190, the communication session manager 140, the audio analyzer 142, the speech-to-text network 202, the feature extractor 402, the acoustic model 406, the decoder 410, the language model 412, the topic detector 420, the integrated circuit 1102 of FIG. 11, the device 2100 of FIG. 21, the processor 2106, the processor(s) 2110, one or more other circuits or components configured to detect, during a communication session that includes an audio component and a video component, that the audio component includes particular speech of a participant of the communication session, or any combination thereof.

In conjunction with the described implementations, the apparatus includes means for detecting that the video component includes an object that is associated with the particular speech. For example, the means for detecting that the video component includes an object that is associated with the particular speech can correspond to one of the devices 102 of FIG. 1, the processor(s) 190, the communication session manager 140, the video analyzer 146, the image-to-object network 204, the document analyzer 222, the speech-to-object matcher 240, the pre-processor 510, the detection model 520, the integrated circuit 1102 of FIG. 11, the device 2100 of FIG. 21, the processor 2106, the processor(s) 2110, one or more other circuits or components configured to detect that the video component includes an object that is associated with the particular speech, or any combination thereof.

In conjunction with the described implementations, the apparatus includes means for updating the video component to apply a visual indicator to the object, the visual indicator including at least one of a pointer indicator, a text effect, or highlighting. For example, the means for updating the video component can correspond to one of the devices 102 of FIG. 1, the processor(s) 190, the communication session manager 140, the video updater 150, the integrated circuit 1102 of FIG. 11, the device 2100 of FIG. 21, the processor 2106, the processor(s) 2110, one or more other circuits or components configured to update the video component to apply a visual indicator to the object, the visual indicator including at least one of a pointer indicator, a text effect, or highlighting, or any combination thereof.

In some implementations, a non-transitory computer-readable medium (e.g., a computer-readable storage device, such as the memory 2186) includes instructions (e.g., the instructions 2156) that, when executed by one or more processors (e.g., the processor(s) 190, the processor(s) 2110, or the processor 2106), cause the one or more processors to detect, during a communication session (the communication session 130) that includes an audio component (e.g., the audio component 132) and a video component (the video component 134), that the audio component includes particular speech (e.g., the topic 144) of a participant (e.g., a person 110) of the communication session, detect that the video component includes an object (e.g., an object 148) that is associated with the particular speech, and apply a visual indicator (e.g., the visual indicator 152) to the object, the visual indicator including at least one of a pointer indicator, a text effect, or highlighting.

Particular aspects of the disclosure are described below in sets of interrelated Examples:

According to Example 1, a device comprises: one or more processors configured to: detect, during a communication session that includes an audio component and a video component, that the audio component includes particular speech of a participant of the communication session; detect that the video component includes an object that is associated with the particular speech; and update the video component to apply a visual indicator to the object, the visual indicator including at least one of a pointer indicator, a text effect, or highlighting.

Example 2 includes the device of Example 1, wherein the one or more processors are configured to use a speech-to-text network to process the audio component to detect the particular speech.

Example 3 includes the device of Example 1 or Example 2, wherein the one or more processors are configured to use an image-to-object network to process the video component to detect the object.

Example 4 includes the device of any of Example 1 to Example 3, wherein the object includes at least one of: text, a bullet point, a table element, or a graphical element that includes text.

Example 5 includes the device of any of Example 1 to Example 3, wherein the object includes text.

Example 6 includes the device of any of Example 1 to Example 3, wherein the object includes a graphical element that includes text.

Example 7 includes the device of any of Example 1 to Example 3, wherein the object includes a bullet point.

Example 8 includes the device of any of Example 1 to Example 3, wherein the object includes a table element.

Example 9 includes the device of any of Example 1 to Example 8, wherein the particular speech corresponds to a keyword or a topic.

Example 10 includes the device of any of Example 1 to Example 8, wherein the particular speech corresponds to a keyword.

Example 11 includes the device of any of Example 1 to Example 8, wherein the particular speech corresponds to or a topic.

Example 12 includes the device of any of Example 1 to Example 11, wherein the communication session corresponds to at least one of: a conference call, a seminar, or a multi-participant extended reality session.

Example 13 includes the device of any of Example 1 to Example 11, wherein the communication session corresponds to a conference call.

Example 14 includes the device of any of Example 1 to Example 11, wherein the communication session corresponds to a seminar.

Example 15 includes the device of any of Example 1 to Example 11, wherein the communication session corresponds to a multi-participant extended reality session.

Example 16 includes the device of any of Example 1 to Example 15, wherein the one or more processors are further configured to, prior to a start of the communication session, analyze one or more presentation documents associated with the communication session to detect presentation objects in the one or more presentation documents, and wherein, during the communication session, detection of the object is at least partially based on a determination that at least one of the presentation objects is associated with the particular speech.

Example 17 includes the device of any of Example 1 to Example 16, wherein the one or more processors are further configured to: process, during the communication session, the audio component to detect a discussion topic; perform a search of one or more networks to locate a diagram associated with the discussion topic; and update the video component to include the diagram.

Example 18 includes the device of any of Example 1 to Example 17, wherein the one or more processors are further configured to: detect, during the communication session, that the audio component includes an utterance that is mapped to a particular action associated with a presentation document; and update the video component to depict a result of performance of the particular action.

Example 19 includes the device of Example 18, wherein the one or more processors are further configured to: for each page, of a presentation document, that was previously displayed during the communication session, track a position of a most recent visual indicator that was depicted on that page; and based on the particular action corresponding to re-displaying a particular page of the previously displayed pages, update the video component to display the particular page and to restore the most recent visual indicator for the particular page.

Example 20 includes the device of any of Example 1 to Example 19, wherein the one or more processors are further configured to: detect, during the communication session, that the audio component includes a description of a component of a presentation object; and based on determining that the component of the presentation object is not present in the video component, update the video component to generate a representation of the component of the presentation object 0 based on the description.

Example 21 includes the device of Example 20, wherein the component of the presentation object includes an element of a flow chart, a timeline, or a block diagram.

Example 22 includes the device of any of Example 1 to Example 21, wherein the one or more processors are included in an end-user device of the participant of the communication session.

Example 23 includes the device of any of Example 1 to Example 22, wherein the one or more processors are included in an end-user device configured to receive, from a remote device, a media stream that includes the audio component and the video component.

Example 24 includes the device of any of Example 1 to Example 22, wherein the one or more processors are included in an end-user device configured to send a media stream that includes the audio component and the updated video component to a remote device.

Example 25 includes the device of any of Example 1 to Example 24, wherein the one or more processors are integrated in a headset that further comprises a microphone coupled to the one or more processors, and wherein the microphone is configured to capture the particular speech of the participant to enable the participant to deliver a hands-free presentation with automatic visual indicators during the communication session while the participant is engaged in physical activity.

Example 26 includes the device of Example 25, wherein the headset corresponds to an extended reality headset that further comprises a display device coupled to the one or more processors, and wherein the one or more processors are further configured to display the updated video component at the display device.

Example 27 includes the device of any of Example 1 to Example 24, wherein the one or more processors are integrated in a vehicle that further comprises a microphone coupled to the one or more processors, and wherein the microphone is configured to capture the particular speech of the participant to enable the participant to deliver a hands-free presentation with automatic visual indicators during the communication session while the participant is an occupant of the vehicle.

Example 28 includes the device of any of Example 1 to Example 27, further comprising a speaker configured to play out sound based on the audio component.

Example 29 includes the device of any of Example 1 to Example 28, further comprising a microphone configured to capture the particular speech of the participant.

Example 30 includes the device of any of Example 1 to Example 29, further comprising a display device configured to display the updated video component.

Example 31 includes the device of any of Example 1 to Example 21, wherein the one or more processors are included in a communication session server configured to send the updated video component to one or more end-user devices of participants of the communication session.

Example 32 includes the device of any of Example 1 to Example 31, further comprising a modem configured to receive at least one of the audio component or the video component from a remote device.

According to Example 33, a method comprises: detecting, at a device and during a communication session that includes an audio component and a video component, that the audio component includes particular speech of a participant of the communication session; detecting, at the device, that the video component includes an object that is associated with the particular speech; and updating, at the device, the video component to apply a visual indicator to the object, the visual indicator including at least one of a pointer indicator, a text effect, or highlighting.

Example 34 includes the method of Example 33, further comprising, during the communication session: processing the audio component to detect a discussion topic; performing a search of one or more data sources to locate a diagram associated with the discussion topic; and updating the video component to include the diagram.

Example 35 includes the method of Example 33 or Example 34, further comprising, during the communication session: detecting that the audio component includes an utterance that is mapped to a particular action associated with a presentation document; and updating the video component to depict a result of performance of the particular action.

Example 36 includes the method of any of Example 33 to Example 35, further comprising, during the communication session: detecting that the audio component includes a description of a component of a presentation object; and based on determining that the component of the presentation object is not present in the video component, updating the video component to generate a representation of the component of the presentation object based on the description.

Example 37 includes the method of Example 36, wherein the component of the presentation object includes an element of a flow chart, a timeline, or a block diagram.

Example 38 includes the method of any of Example 33 to Example 37, wherein the object includes at least one of: text, a bullet point, a table element, or a graphical element that includes text.

Example 39 includes the method of any of Example 33 to Example 37, wherein the object includes text.

Example 40 includes the method of any of Example 33 to Example 37, wherein the object includes a graphical element that includes text.

Example 41 includes the method of any of Example 33 to Example 37, wherein the object includes a bullet point.

Example 42 includes the method of any of Example 33 to Example 37, wherein the object includes a table element.

Example 43 includes the method of any of Example 33 to Example 42, wherein the particular speech corresponds to a keyword or a topic.

Example 44 includes the method of any of Example 33 to Example 42, wherein the particular speech corresponds to a keyword.

Example 45 includes the method of any of Example 33 to Example 42, wherein the particular speech corresponds to a topic.

Example 46 includes the method of any of Example 33 to Example 45, wherein the communication session corresponds to at least one of: a conference call, a seminar, or a multi-participant extended reality session.

Example 47 includes the method of any of Example 33 to Example 45, wherein the communication session corresponds to a conference call.

Example 48 includes the method of any of Example 33 to Example 45, wherein the communication session corresponds to a seminar.

Example 49 includes the method of any of Example 33 to Example 45, wherein the communication session corresponds to a multi-participant extended reality session.

Example 50 includes the method any of Example 33 to Example 49, further comprising, prior to a start of the communication session, analyzing one or more presentation documents associated with the communication session to detect presentation objects in the one or more presentation documents, and wherein, during the communication session, detection of the object is at least partially based on a determination that at least one of the presentation objects is associated with the particular speech.

Example 51 includes the method of any of Example 33 to Example 50, wherein the device corresponds to an end-user device of the participant of the communication session.

Example 52 includes the method of any of Example 33 to Example 50, further comprising receiving, from a remote device, a media stream that includes the audio component and the video component, and wherein the device corresponds to an end-user device.

Example 53 includes the method of any of Example 33 to Example 50, wherein the device corresponds to an end-user device, and further comprising sending a media stream that includes the audio component and the updated video component to a remote device.

Example 54 includes the method of any of Example 33 to Example 53, wherein the device corresponds to a headset, and further comprising capturing the particular speech of the participant to enable the participant to deliver a hands-free presentation with automatic visual indicators during the communication session while the participant is engaged in physical activity.

Example 55 includes the method of Example 54, wherein the headset corresponds to an extended reality headset, and further comprising displaying the updated video component at a display device of the extended reality headset.

Example 56 includes the method of any of Example 33 to Example 53, wherein the device corresponds to a vehicle, and further comprising capturing the particular speech of the participant to enable the participant to deliver a hands-free presentation with automatic visual indicators during the communication session while the participant is an occupant of the vehicle.

Example 57 includes the method of any of Example 33 to Example 56, further comprising playing out, via a speaker, sound based on the audio component.

Example 58 includes the method of any of Example 33 to Example 57, further comprising capturing, via a microphone, the particular speech of the participant.

Example 59 includes the method of any of Example 33 to Example 59, further comprising displaying the updated video component at a display device.

According to Example 60, a device comprises: a memory configured to store instructions; and a processor configured to execute the instructions to perform the method of any of Example 33 to Example 59.

According to Example 61, a non-transitory computer-readable medium stores instructions that, when executed by one or more processors, cause the one or more processors to perform the method of any of Example 33 to Example 59.

According to Example 62, an apparatus comprising means for performing the method of any of Example 33 to Example 59.

According to Example 63, a non-transitory computer-readable medium stores instructions that, when executed by one or more processors, cause the one or more processors to: detect, during a communication session that includes an audio component and a video component, that the audio component includes particular speech of a participant of the communication session; detect that the video component includes an object that is associated with the particular speech; and update the video component to apply a visual indicator to the object, the visual indicator including at least one of a pointer indicator, a text effect, or highlighting.

According to Example 64, an apparatus comprises: means for detecting, during a communication session that includes an audio component and a video component, that the audio component includes particular speech of a participant of the communication session; means for detecting that the video component includes an object that is associated with the particular speech; and means for updating the video component to apply a visual indicator to the object, the visual indicator including at least one of a pointer indicator, a text effect, or highlighting.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device comprising:
   one or more processors configured to:
      prior to a start of a communication session, analyze one or more presentation documents associated with the communication session to detect one or more presentation objects in the one or more presentation documents;
      detect, during a the communication session that includes an audio component and a video component, that the audio component includes particular speech of a participant of the communication session;
      detect, during the communication session, that the video component includes an object that is associated with the particular speech and at least partially based on a determination that at least one presentation object, of the one or more presentation objects, is associated with the particular speech; and
      update, during the communication session, the video component to apply a visual indicator to the object, the visual indicator including at least one of a pointer indicator, a text effect, or highlighting.

2. The device of claim 1, wherein the one or more processors are configured to use a speech-to-text network to process the audio component to detect the particular speech.

3. The device of claim 1, wherein the one or more processors are configured to use an image-to-object network to process the video component to detect the object.

4. The device of claim 1, wherein the object includes at least one of: text, a bullet point, a table element, or a graphical element that includes text.

5. The device of claim 1, wherein the particular speech corresponds to a keyword or a topic.

6. The device of claim 1, wherein the communication session corresponds to at least one of: a conference call, a seminar, or a multi-participant extended reality session.

7. The device of claim 1, wherein the one or more processors are included in an end-user device of the participant of the communication session.

8. The device of claim 1, wherein the one or more processors are included in an end-user device configured to receive, from a remote device, a media stream that includes the audio component and the video component.

9. The device of claim 1, wherein the one or more processors are included in an end-user device configured to send a media stream that includes the audio component and the updated video component to a remote device.

10. The device of claim 1, wherein the one or more processors are included in a communication session server configured to send the updated video component to one or more end-user devices of participants of the communication session.

11. The device of claim 1, wherein the one or more processors are further configured to:
   process, during the communication session, the audio component to detect a discussion topic;
   perform a search of one or more networks to locate a diagram associated with the discussion topic; and
   update the video component to include the diagram.

12. The device of claim 1, wherein the one or more processors are further configured to:
   detect, during the communication session, that the audio component includes an utterance that is mapped to a particular action associated with a the presentation document; and
   update the video component to depict a result of performance of the particular action.

13. The device of claim 12, wherein the one or more processors are further configured to:
   for each page, of a the presentation document, that was previously displayed during the communication session, track a position of a most recent visual indicator that was depicted on that page; and
   based on the particular action corresponding to re-displaying a particular page of the previously displayed pages, update the video component to display the particular page and to restore the most recent visual indicator for the particular page.

14. The device of claim 1, wherein the one or more processors are further configured to:
   detect, during the communication session, that the audio component includes a description of a component of a the at least one presentation object; and
   based on determining that the component of the at least one presentation object is not present in the video component, update the video component to generate a representation of the component of the presentation object based on the description.

15. The device of claim 14, wherein the component of the presentation object includes an element of a flow chart, a timeline, or a block diagram.

16. The device of claim 1, wherein the one or more processors are integrated in a headset that further comprises a microphone coupled to the one or more processors, and wherein the microphone is configured to capture the particular speech of the participant to enable the participant to deliver a hands-free presentation with automatic visual indicators during the communication session while the participant is engaged in physical activity.

17. The device of claim 16, wherein the headset corresponds to an extended reality headset that further comprises a display device coupled to the one or more processors, and wherein the one or more processors are further configured to display the updated video component at the display device.

18. The device of claim 1, wherein the one or more processors are integrated in a vehicle that further comprises a microphone coupled to the one or more processors, and wherein the microphone is configured to capture the particular speech of the participant to enable the participant to deliver a hands-free presentation with automatic visual indicators during the communication session while the participant is an occupant of the vehicle.

19. The device of claim 1, further comprising a modem configured to receive at least one of the audio component or the video component from a remote device.

20. The device of claim 1, further comprising a speaker configured to play out sound based on the audio component.

21. The device of claim 1, further comprising a microphone configured to capture the particular speech of the participant.

22. The device of claim 1, further comprising a display device configured to display the updated video component.

23. A method comprising:
prior to a start of a communication session, analyzing one or more presentation documents associated with the communication session to detect one or more presentation objects in the one or more presentation documents;
detecting, during the communication session that includes an audio component and a video component, that the audio component includes particular speech of a participant of the communication session;
detecting, during the communication session, that the video component includes an object that is associated with the particular speech and at least partially based on a determination that at least one presentation object, of the one or more presentation objects, is associated with the particular speech; and
updating, during the communication session, the video component to apply a visual indicator to the object, the visual indicator including at least one of a pointer indicator, a text effect, or highlighting.

24. The method of claim 23, wherein the object includes at least one of: text, a bullet point, a table element, or a graphical element that includes text.

25. The method of claim 23, further comprising, during the communication session:
processing the audio component to detect a discussion topic;
performing a search of one or more data sources to locate a diagram associated with the discussion topic; and
updating the video component to include the diagram.

26. The method of claim 23, further comprising, during the communication session:
detecting that the audio component includes an utterance that is mapped to a particular action associated with a the presentation document; and
updating the video component to depict a result of performance of the particular action.

27. The method of claim 23, further comprising, during the communication session:
detecting that the audio component includes a description of a component of a presentation object; and
based on determining that the component of the at least one presentation object is not present in the video component, updating the video component to generate a representation of the component of the presentation object based on the description.

28. A non-transitory computer-readable medium storing instructions that, when executed by one or more processors, cause the one or more processors to:
prior to a start of a communication session, analyze one or more presentation documents associated with the communication session to detect one or more presentation objects in the one or more presentation documents;
detect, during the communication session that includes an audio component and a video component, that the audio component includes particular speech of a participant of the communication session;
detect, during the communication session, that the video component includes an object that is associated with the particular speech and at least partially based on a determination that at least one presentation object, of the one or more presentation objects, is associated with the particular speech; and
update, during the communication session, the video component to apply a visual indicator to the object, the visual indicator including at least one of a pointer indicator, a text effect, or highlighting.

29. An apparatus comprising:
prior to a start of a communication session, means for analyzing one or more presentation documents associated with the communication session to detect one or more presentation objects in the one or more presentation documents;
means for detecting, during the communication session that includes an audio component and a video component, that the audio component includes particular speech of a participant of the communication session;
means for detecting, during the communication session, that the video component includes an object that is associated with the particular speech and at least partially based on a determination that at least one presentation object, of the one more presentation objects, is associated with the particular speech; and
means for updating, during the communication session, the video component to apply a visual indicator to the object, the visual indicator including at least one of a pointer indicator, a text effect, or highlighting.

* * * * *